United States Patent
Egan et al.

(10) Patent No.: US 12,423,486 B2
(45) Date of Patent: Sep. 23, 2025

(54) SYSTEM AND METHOD FOR PROCESS WINDOW OPTIMIZATION IN A VIRTUAL SEMICONDUCTOR DEVICE FABRICATION ENVIRONMENT

(71) Applicant: Coventor, Inc., Cary, NC (US)

(72) Inventors: William J. Egan, Framingham, MA (US); Anshuman Kunwar, Jamaica Plain, MA (US); Kenneth B. Greiner, Arlington, MA (US); David M. Fried, South Salem, NY (US)

(73) Assignee: Coventor, Inc., Cary, NC (US)

( * ) Notice: Subject to any disclaimer, the term of this patent is extended or adjusted under 35 U.S.C. 154(b) by 752 days.

(21) Appl. No.: 16/870,518

(22) Filed: May 8, 2020

(65) Prior Publication Data

US 2020/0356711 A1 Nov. 12, 2020

Related U.S. Application Data

(60) Provisional application No. 62/846,402, filed on May 10, 2019.

(51) Int. Cl.
- *G06F 30/20* (2020.01)
- *G06F 111/08* (2020.01)
- *G06F 119/22* (2020.01)

(52) U.S. Cl.
CPC .......... *G06F 30/20* (2020.01); *G06F 2111/08* (2020.01); *G06F 2119/22* (2020.01)

(58) Field of Classification Search
CPC ... G06F 30/20; G06F 2111/08; G06F 2119/22

USPC ............................................ 703/2
See application file for complete search history.

(56) References Cited

U.S. PATENT DOCUMENTS

| | | |
|---|---|---|
| 5,416,729 A | 5/1995 | Leon et al. |
| 5,473,710 A | 12/1995 | Jaw et al. |
| 6,116,766 A | 9/2000 | Maseeh et al. |
| 7,492,364 B2 | 2/2009 | Devarajan et al. |
| 7,526,739 B2 | 4/2009 | McIlrath |
| 8,032,857 B2 | 10/2011 | McIlrath |
| 8,209,649 B2 | 6/2012 | McIlrath |
| 8,266,560 B2 | 9/2012 | McIlrath |
| 8,285,412 B2 | 10/2012 | Kyoh |
| 8,606,774 B1 | 12/2013 | Makadia et al. |
| 8,691,599 B2 | 4/2014 | Guo et al. |
| 8,832,620 B1* | 9/2014 | Fried ............. G06F 30/398 716/110 |

(Continued)

FOREIGN PATENT DOCUMENTS

| | | |
|---|---|---|
| CN | 103823917 A | 5/2014 |
| CN | 103970954 A | 8/2014 |

(Continued)

OTHER PUBLICATIONS

AP_Stats_Guide_2017 (ilearnacademy.net stat review notes) (Year: 2017).*

(Continued)

*Primary Examiner* — Brian S Cook
(74) *Attorney, Agent, or Firm* — Weaver Austin Villeneuve & Sampson LLP

(57) ABSTRACT

A virtual fabrication environment for semiconductor device fabrication that includes an analytics module for performing process window optimization is discussed.

22 Claims, 23 Drawing Sheets

(56) References Cited

U.S. PATENT DOCUMENTS

| | | | |
|---|---|---|---|
| 8,959,464 B2 | 2/2015 | Greiner et al. |
| 9,317,632 B2 | 4/2016 | Faken et al. |
| 9,965,577 B2 | 5/2018 | Kamon et al. |
| 10,242,142 B2 | 3/2019 | Greiner et al. |
| 11,144,701 B2 | 10/2021 | Egan et al. |
| 11,861,289 B2 | 1/2024 | Egan et al. |
| 2002/0037596 A1 | 3/2002 | Yamaguchi |
| 2005/0076316 A1 | 4/2005 | Pierrat et al. |
| 2005/0198602 A1 | 9/2005 | Brankner |
| 2005/0240895 A1 | 10/2005 | Smith et al. |
| 2006/0054088 A1 | 3/2006 | Jagawa et al. |
| 2007/0031745 A1 | 2/2007 | Ye et al. |
| 2007/0035716 A1 | 2/2007 | Yoshii et al. |
| 2007/0100487 A1 | 5/2007 | Cheng et al. |
| 2007/0118349 A1 | 5/2007 | Jakatdar et al. |
| 2007/0198114 A1 | 8/2007 | Hashima et al. |
| 2008/0058978 A1 | 3/2008 | Cain et al. |
| 2008/0104562 A1 | 5/2008 | Ichinose |
| 2009/0006039 A1 | 1/2009 | Watanabe |
| 2009/0024377 A1 | 1/2009 | Min |
| 2009/0055789 A1 | 2/2009 | McIlrath |
| 2009/0064058 A1 | 3/2009 | McIlrath |
| 2009/0144042 A1 | 6/2009 | Lorenz et al. |
| 2009/0249263 A1 | 10/2009 | Arimoto |
| 2010/0005437 A1 | 1/2010 | McIlrath |
| 2010/0180241 A1 | 7/2010 | Asai |
| 2011/0138343 A1 | 6/2011 | Granik |
| 2011/0153271 A1 | 6/2011 | Tiwary et al. |
| 2011/0185323 A1 | 7/2011 | Hogan et al. |
| 2011/0289472 A1 | 11/2011 | Finkler et al. |
| 2011/0314437 A1 | 12/2011 | McIlrath |
| 2012/0129301 A1 | 5/2012 | Or-Bach et al. |
| 2012/0239178 A1 | 9/2012 | Wu et al. |
| 2012/0248595 A1 | 10/2012 | Or-Bach et al. |
| 2012/0264237 A1 | 10/2012 | Shearn et al. |
| 2012/0264514 A1 | 10/2012 | Lee et al. |
| 2012/0317528 A1 | 12/2012 | McIlrath |
| 2013/0130498 A1 | 5/2013 | Feustel et al. |
| 2013/0275937 A1 | 10/2013 | Joshi et al. |
| 2013/0339918 A1 | 12/2013 | Clark |
| 2014/0278266 A1 | 9/2014 | Faken et al. |
| 2014/0282324 A1 | 9/2014 | Greiner et al. |
| 2014/0282328 A1 | 9/2014 | Fried et al. |
| 2015/0195091 A1 | 7/2015 | Kubota et al. |
| 2017/0039308 A1 | 2/2017 | Moroz et al. |
| 2018/0095936 A1 | 4/2018 | Bonnecaze et al. |
| 2018/0365370 A1 | 12/2018 | Egan et al. |
| 2019/0065630 A1 | 2/2019 | Kim et al. |
| 2019/0163075 A1 | 5/2019 | Theeuwes et al. |
| 2022/0019724 A1 | 1/2022 | Egan et al. |
| 2022/0198333 A1 | 6/2022 | Pack et al. |
| 2023/0252211 A1 | 8/2023 | Egan et al. |
| 2024/0070373 A1 | 2/2024 | Egan et al. |

FOREIGN PATENT DOCUMENTS

| | | | |
|---|---|---|---|
| CN | 105830069 | * | 8/2016 |
| GB | 2482076 A | | 1/2012 |
| JP | H0536832 A | | 2/1993 |
| JP | H07115071 A | | 5/1995 |
| JP | H08107050 A | | 4/1996 |
| JP | 2002305253 A | | 10/2002 |
| JP | 2003-324041 A | | 11/2003 |
| JP | 2003-345854 A | | 12/2003 |
| JP | 2005019524 A | | 1/2005 |
| JP | 2006178907 A | | 7/2006 |
| JP | 2006268558 A | | 10/2006 |
| JP | 2007-507889 A | | 3/2007 |
| JP | 2007-535135 A | | 11/2007 |
| JP | 2008034714 A | | 2/2008 |
| JP | 2011-082562 A | | 4/2011 |
| JP | 2011113291 A | | 6/2011 |
| JP | 2016004421 A | | 1/2016 |
| JP | 2016512641 A | | 4/2016 |
| JP | 2017037441 A | | 2/2017 |
| JP | 2017090947 A | | 5/2017 |
| JP | 2021504743 A | | 2/2021 |
| KR | 20220125208 A | | 9/2022 |
| TW | 200849052 A | | 12/2008 |
| TW | 200912888 A | | 3/2009 |
| TW | I342469 B | | 5/2011 |
| TW | 201500949 A | | 1/2015 |
| TW | 201500950 A | | 1/2015 |
| TW | 201539226 A | | 10/2015 |
| TW | 201913849 A | | 4/2019 |
| WO | WO-2011078930 A1 | * | 6/2011 ........... G06K 9/6226 |
| WO | WO-2015112979 A1 | | 7/2015 |

OTHER PUBLICATIONS

Science_Direct_2018 (Completion Rate) (Year: 2018).*
Miller_2008 (Statistical Design an Opt for Amplifiers, Sep. 10, 2008). (Year: 2008).*
Genesys_2010 (Genesys Apr. 2009 User Guide: Yield/Monte Carlo) (Year: 2010).*
Miller_2014 (Using Statistical Design May 27, 2014). (Year: 2014).*
Kagaiwalla_2010 (Design-Aware Mask Inspection, Dec. 2010) (Year: 2010).*
ECE723_Lec5_2014 (Lecture 5: Lithography MAPUA Institute of Technology, 2014). (Year: 2014).*
Autoform_2019 (Sensitivity Analysis downloaded from Web.archive. org dated Apr. 3, 2019) (Year: 2019).*
Clark et al., A million wafer, virtual fabrication approach to determine process capability requirements for an industry-standard 5nm BEOL two-level metal flow. Simulation of Semiconductor Processes and Devices. IEEE, pp. 43-46, (2016).
Conover, Practical Nonparametric Statistics, Third Edition. John Wiley & Sons, Inc., New York. pp. 442-447, (1999).
Czitrom, One-factor-at-a-time versus designed experiments. The American Statistician. May 1, 1999;53(2):126-31.
Montgomery, Design and Analysis of Experiments, Eighth Edition. John Wiley & Sons, Inc. pp. 11-21, 183-189, (2013).
Neter et al., Applied Linear Statistical Models, Fourth Edition. Irwin, Chicago. pp. 288-295, 347-352, (1996).
Davies R H., et al., "Building 3-D statistical Shape Models by Direct Optimization," IEEE Transactions on Medical Imaging, vol. 29(4), Apr. 2010, pp. 961-981.
Egan J W et al., "Measurement of Carboxyhemoglobin in Forensic Blood Samples Using UV-Visible Spectrometry and Improved Principal Component Regression," Applied Spectroscopy. Feb. 1, 1999 vol. 53(2), pp. 218-225.
Fisher, "Design of Experiments," Hafner Publishing Company, New York. p. 94, (1971).
Greenwood et al., "Sample size required for estimating the standard deviation as a per cent of its true value," Journal of the American Statistical Association, Jun. 1, 1950 vol. 45(250), pp. 257-260.
JMP, Design of Experiments Guide, Version 13. JMP Statistical Discovery From SAS. 708 pages, Sep. 2016.
Jones et al., "Definitive screening designs with added two-level categorical factors," Journal of Quality Technology, Apr. 1, 2013, vol. 45(2), pp. 121-129.
Jones et al., "A class of three-level designs for definitive screening in the presence of second-order effects," Journal of quality Technology, Jan. 1, 2011, vol. 43(1), pp. 1-5.
JP Office Action dated Mar. 22, 2023, in application No. JP 2022-103142 with English translation.
JP Office Action dated May 31, 2022, in application No. JP 2018-115285 with English translation.
KR Office Action dated Mar. 14, 2023, in application No. KR 10-2018-0069418 with English translation.
KR Office Action dated Sep. 14, 2022, in application No. KR 10-2018-0069418 with English translation.
Martinez et al., "Computational Statistics Handbook with MATLAB, Second Edition, Computer Science and Data Analysis Series," Chapman & Hall/CRC, Taylor & Francis Group, Boca Raton, 2008, pp. 126-132.
Rasmussen et al., "Gaussian Processes for Machine Learning," The MIT Press, www.GaussianProcess.org/gpml, 2006, pp. 1-266 pages.

(56) References Cited

OTHER PUBLICATIONS

Riffenburgh, "Statistics in Medicine," Third Edition. Academic Press, Amsterdam, 2012, pp. 150-151.
Rousseeuw, "Tutorial to robust statistics," Journal of Chemometrics. Jan. 1991, vol. 5(1), pp. 1-20.
Schropfer et al., "Novel 3D Modeling Methods for Virtual Fabrication and EDA Compatible Design of MEMS Via Parametric Libraries," J Micromech Microeng. Jun. 2010, vol. 20(6), pp. 1-15.
Spallek et al., "Modelling and Simulating the Selective Epitaxial Growth of Silicon under Consideration of Anisotropic growth Rates," ESSDERC '03, 33rd Conference on European Solid-State Device Research, 2003, pp. 387-390.
Synopsys, "Sentaurus Workbench Comprehensive Framework Environment," Data Sheet. Synopsys, Inc., 2005, www.ynopsys.com.
TW Office Action dated Feb. 24, 2022, in application No. TW20180120904 with English translation.
TW Office Action dated Nov. 4, 2022, in application No. TW111136832with English translation.
U.S. Final office Action dated May 24, 2023 in U.S. Appl. No. 17/477,472.
U.S. Non-Final Office Action dated Feb. 8, 2023, in U.S. Appl. No. 17/477,472.
U.S. Non-Final Office Action dated Nov. 25, 2020, in U.S. Appl. No. 16/010,537.
U.S. Notice of Allowance dated Jun. 9, 2021 in U.S. Appl. No. 16/010,537.
Xiao et al., "Constructing definitive screening designs using conference matrices," Journal of Quality Technology, 2012 an 1, vol. 44(1), pp. 2-8.
Guler, S et al., "Bayesian Optimization for Tuning Lithography Processes," IFAC—PapersOnLine, 2021, vol. 54(7), pp. 827-832.
TW Office Action dated Aug. 21, 2023 in Application No. TW112119637 with English translation.
TW Office Action dated Jul. 31, 2023 in Application No. TW109115374 with English translation.
TW Office Action dated Nov. 21, 2023 in TW Application No. 112119637 with English translation.
U.S. Notice of Allowance dated Aug. 7, 2023 in U.S. Appl. No. 17/477,472.
U.S. Notice of Allowance dated Nov. 22, 2023 in U.S. Appl. No. 17/477,472.
International Search Report and Written Opinion dated Jan. 23, 2024 in PCT Application No. PCT/US2023/033955.
CN Office Action dated May 12, 2024 in CN Application No. 201810629679.9 with English translation.
JP Office Action dated May 21, 2024 in JP Application No. 2023-066796 with English translation.
TW Office Action dated May 20, 2024 in TW Application No. 113100510 with English translation.
International Preliminary Report on Patentability and Written Opinion dated Jan. 26, 2023 in PCT Application No. PCT/US2021/041700.
International Search Report and Written Opinion dated Oct. 27, 2021 in PCT Application No. PCT/US2021/041700.
Ahn Nguyen Duc, "Are 200 replicates per scenario enough for a simulation study?", ResearchGate, Jun. 4, 2014, 3 pages, retrieved on Dec. 6, 2024, from: https://www.researchgate.net/post/Are-200-replicates-per-scenario-enough-for-a-simulation-study.
JP Office Action dated Nov. 5, 2024 in JP Application No. 2023-066796, with English Translation.
Koehler, E., et al., "On the Assessment of Monte Carlo Error in Simulation-based Statistical Analyses," The American Statistician, 2009, vol. 63(2), pp. 155-162.
KR Office Action dated Dec. 5, 2024 in KR Application No. 10-2024-0052031, with English Translation.
U.S. Non-Final Office Action dated Nov. 27, 2024 in U.S. Appl. No. 18/503,718.

* cited by examiner (Prior Art)

(Prior Art)

(Prior Art)

(Prior Art)

*(Prior Art)*

Figure 11

| | |
|---|---|
| Assembly File | C:\ST1_Example\Virtual_3way_Grid\ST1_Example.zam |
| Process File | C:\ST1_Example\Virtual_3way_Grid\ST1_Example.vproc |
| Layout File | C:\ST1_Example\Virtual_3way_Grid\Demo_Layouts.cat |
| Layer Map File | |
| Top Cell | Cell6x6 |
| Output directory | ST1_Example_batch |
| Working directory | C:\ST1_Example\Virtual_3way_Grid |

| Run | 1.19.depth | 1.22.depth | 2.depth | STP_STIPG_DGL | THK_STIPFIN_STI | STP_STIPG_PNS | STP_STIPG_GDD |
|---|---|---|---|---|---|---|---|
| 0 (1) | 15.5 | 52.5 | 2 | 24.381696 | 167 | 11.985417 | 10.757186 |
| 1 (2) | 17.75 | 52.5 | 2 | 27.539265 | 164 | 8.658854 | 7.441058 |
| 2 (3) | 20 | 52.5 | 2 | 30.732833 | 160 | 5.37036 | 4.127793 |
| 3 (4) | 22.25 | 52.5 | 2 | 33.890625 | 157 | 2.116406 | 0.866027 |
| 4 (5) | 24.5 | 52.5 | 2 | 37.047595 | 154 | NaN | NaN |
| 5 (6) | 15.5 | 56.25 | 2 | 24.381696 | 167 | 11.871823 | 10.651568 |
| 6 (7) | 17.75 | 56.25 | 2 | 27.539265 | 164 | 8.582142 | 7.317439 |
| 7 (8) | 20 | 56.25 | 2 | 30.732833 | 160 | 5.269715 | 4.032957 |
| 8 (9) | 22.25 | 56.25 | 2 | 33.890625 | 157 | 2.012943 | 0.780521 |
| 9 (10) | 24.5 | 56.25 | 2 | 37.047595 | 153 | NaN | NaN |
| 10 (11) | 15.5 | 60 | 2 | 24.381696 | 167 | 11.795147 | 10.529056 |
| 11 (12) | 17.75 | 60 | 2 | 27.539265 | 163 | 8.481802 | 7.22371 |
| 12 (13) | 20 | 60 | 2 | 30.732833 | 160 | 5.165463 | 3.942212 |
| 13 (14) | 22.25 | 60 | 2 | 33.890625 | 157 | 1.894331 | NaN |
| 14 (15) | 24.5 | 60 | 2 | 37.047595 | 153 | NaN | NaN |
| 15 (16) | 15.5 | 63.75 | 2 | 24.381696 | 167 | 11.693568 | 10.415309 |
| 16 (17) | 17.75 | 63.75 | 2 | 27.539265 | 163 | 8.37849 | 7.159459 |

*(Prior Art)*

Figure 14B

| Selected Inputs | | | | | |
|---|---|---|---|---|---|
| Name | 1452 Search Space Lower Limit | 1454 Search Space Upper Limit | 1456a POR Nominal | 1456b POR Distribution | 1456c POR Width/Std |
| 2.2.9.2.2:materials/[]/Silicon/[].etchType.taper.sidewallAngle | 0 | 10 | 5 | Normal | 1 |
| 2.1.9:lithography.dimensionalBias.xBias | 7 | 7 | 0 | Normal | 1 |
| 2.1.15:thickness | 29 | 50 | 39 | Normal | 3 |

| Name | POR Nominal Yield | POR Nominal Value | POR Width/Std | Yield @ POR Nominal & 50% width/std | Yield @ POR Nominal & 75% width/std | Yield @ POR Nominal & 90% width/std | Optimal Yield | Optimal Nominal |
|---|---|---|---|---|---|---|---|---|
| 2.2.6.2.material.Silicon1.EtchType.tape.sidewallAngle | 53.98 | 5 | 1 | 65.88 | 67.46 | 53.22 | 75.55 | 3.22 |
| 2.1.9.lithography.dimensionalBias.xBias | 53.98 | 0 | 1 | 52.89 | 43.11 | 54.09 | 99.93 | -3.74 |
| 2.1.15.thickness | 53.98 | 39 | 3 | 50.84 | 69.16 | 70.38 | 72.18 | 38 |

1610 1612 1614 1616 1618 1620 1622 1624

1602

SYSTEM AND METHOD FOR PROCESS WINDOW OPTIMIZATION IN A VIRTUAL SEMICONDUCTOR DEVICE FABRICATION ENVIRONMENT

RELATED APPLICATION

This application claims the benefit of, and priority to, U.S. Provisional Patent Application No. 62/846,402, filed May 10, 2019 and entitled "System and Method for Process Window Optimization in a Virtual Semiconductor Device Fabrication Environment", the contents of which are hereby incorporated herein in their entirety.

BACKGROUND

Integrated circuits (ICs) implement a myriad of capabilities of modern electronic devices. To make the development of ICs more efficient, a semiconductor manufacturer will periodically develop a common fabrication process or "technology" to be used for production of its integrated circuits (for ease of explanation the term "technology" may be used herein to refer to a fabrication process for a semiconductor device structure that is being developed).

Semiconductor development organizations at integrated device manufacturers (IDMs) and independent foundries spend significant resources developing the integrated sequence of process operations used to fabricate the chips ((ICs) they sell from wafers ("wafers" are thin slices of semiconductor material, frequently, but not always, composed of silicon crystal). A large portion of the resources is spent on fabricating experimental wafers and associated measurement, metrology ("metrology" refers to specialized types of measurements conducted in the semiconductor industry) and characterization structures, all for the purpose of ensuring that the integrated process produces the desired semiconductor device structures. These experimental wafers are used in a trial-and-error scheme to develop individual processes for the fabrication of a device structure and also to develop the total, integrated process flow. Due to the increasing complexity of advanced technology node process flows, a large portion of the experimental fabrication runs result in negative or null characterization results. These experimental runs are long in duration, weeks to months in the "fab" (fabrication environment), and expensive. Semiconductor technology advances, including FinFET, TriGate, High-K/Metal-Gate, embedded memories and advanced patterning, have dramatically increased the complexity of integrated semiconductor fabrication processes. The cost and duration of technology development using this trial-and-error experimental methodology has concurrently increased.

Attempts have been made to use conventional mechanical computer-aided design (CAD) tools and specialized technology CAD (TCAD) tools to model semiconductor device structures, with the goal of reducing the efforts spent on fabricating experimental wafers. General-purpose mechanical CAD tools have been found inadequate because they do not automatically mimic the material addition, removal, and modification processes that occur in an actual fab. TCAD tools, on the other hand, are physics-based modeling platforms that simulate material composition changes that occur during diffusion and implant processes, but not all of the material addition and removal effects that occur during other processes that comprise an integrated process flow. Typically, the 3D device structure is an input to TCAD, not an output. Furthermore because of the amount of data and computations required for physics-based simulations of processes, TCAD simulations are practically restricted to very small regions on a chip, most often encompassing just a single transistor. In state-of-the-art semiconductor fabrication technologies, most of the integration challenge concerns the interaction between processes that may be widely separated in the integrated process flow and the multiple different devices and circuits that comprise a full technology suite (transistors, resistors, capacitors, memories, etc.). Structural failures, stemming from both systematic and random effects, are typically the limiter in time-to-market for a new process technology node. As such, a different modeling platform and approach than mechanical CAD or TCAD is required to cover the larger scope of concern, and to model the entire integrated process flow in a structurally predictive fashion.

A virtual fabrication environment for semiconductor device structures offers a platform for performing semiconductor process development at a lower cost and higher speed than is possible with conventional trial-and-error physical experimentation. In contrast to conventional CAD and TCAD environments, a virtual fabrication environment is capable of virtually modeling an integrated process flow and predicting the complete 3D structures of all devices and circuits that comprise a full technology suite. Virtual fabrication can be described in its most simple form as combining a description of an integrated process sequence with a subject design, in the form of 2D design data (masks or layout), and producing a 3D structural model that is predictive of the result expected from a real/physical fabrication run. A 3D structural model includes the geometrically accurate 3D shapes of multiple layers of materials, implants, diffusions, etc. that comprise a chip or a portion of a chip. Virtual fabrication is done in a way that is primarily geometric, however the geometry involved is instructed by the physics of the fabrication processes. By performing the modeling at the structural level of abstraction (rather than physics-based simulations), construction of the structural models can be dramatically accelerated, enabling full technology modeling, at a circuit-level area scale. The use of a virtual fabrication environment thus provides fast verification of process assumptions, and visualization of the complex interrelationship between the integrated process sequence and the 2D design data.

BRIEF SUMMARY

Embodiments of the present invention provide a virtual fabrication environment for semiconductor device fabrication that includes an analytics module for performing process window optimization. More particularly, the analytics module enables a user accessing a virtual fabrication environment to conduct process window optimization (PWO) to analyze and understand the sensitivity of the yield of the process of record (POR) to parameter nominal values and window sizes. Sensitivity analyses of yield to each parameter are computed by the analytics module in the virtual fabrication environment and the results displayed graphically. Embodiments enable the user to create "what-if" analyses within the search space that assess yield improvement by adjusting parameter nominals and allowed ranges, starting from the POR. In one embodiment, the PWO can calculate a parameter set maximizing yield given a current search space.

In one embodiment, a computing device-implemented method for performing process window optimization in a virtual semiconductor fabrication environment that is performed with at least one computing device equipped with one or more processors includes receiving, for a Design of Experiment (DOE) for a semiconductor device structure to be virtually fabricated in a computing device-generated virtual fabrication environment, a selected deck of 2D design data and a process sequence. The process sequence includes multiple process steps. The method also includes receiving one or more input factors for one or more selected variable parameters for one or more of the process steps in the DOE and performing, based on the DOE, a simulation with a uniform or approximately even type of distribution in the virtual fabrication environment. The simulation includes multiple virtual fabrication runs, the virtual fabrication runs building multiple 3D models of the semiconductor device structure. The method further includes receiving, via a user interface in the virtual fabrication environment, a user selection of one or more virtual metrology optimization targets, each selection of the one or more virtual metrology optimization targets accompanied by a minimum and maximum virtual metrology value. Additionally the method includes identifying in the virtual fabrication environment an optimized result indicating a yield associated with each of the one or more selected variable parameters by limiting a search space to results satisfying the minimum and maximum virtual metrology values for the virtual metrology optimization targets and displaying or exporting the optimized result associated with each of the one or more selected variable parameters.

In another embodiment, a virtual fabrication system includes at least one computing device equipped with one or more processors that is configured to generate a virtual fabrication environment that includes an analytics module. The virtual fabrication environment is configured to receive, for a Design of Experiment (DOE) for a semiconductor device structure to be virtually fabricated, a selected deck of 2D design data and a process sequence that includes multiple process steps and to receive one or more input factors for one or more selected variable parameters for one or more of the process steps in the DOE. The virtual fabrication environment is also configured to perform, based on the DOE, a simulation with a uniform or approximately even type of distribution. The simulation includes multiple virtual fabrication runs, the virtual fabrication runs building multiple 3D models of the semiconductor device structure. The virtual fabrication environment is also configured to receive, via a user interface, a user selection of one or more virtual metrology optimization targets. Each selection of the one or more virtual metrology optimization targets is accompanied by a minimum and maximum virtual metrology value. Further the virtual fabrication environment is configured to identify an optimized result indicating a yield associated with each of the one or more selected variable parameters by limiting a search space to results satisfying the minimum and maximum virtual metrology values for the virtual metrology optimization targets and to display or export the optimized result associated with each of the one or more selected variable parameters. The virtual fabrication system also includes a display surface in communication with the at least one computing device. The display surface is configured to display the 3D structural models in a 3D view and to display the optimized result.

BRIEF DESCRIPTION OF THE DRAWINGS

The accompanying drawings, which are incorporated in and constitute a part of this specification, illustrate one or more embodiments of the invention and, together with the description, help to explain the invention. In the drawings:

FIG. 11 depicts an exemplary tabular-formatted display of virtual metrology data generated in a virtual experiment in the virtual fabrication environment;

FIGS. 14A-14B depict exemplary user interfaces suitable for receiving input factors and specified POR values in an exemplary embodiment;

FIG. 16B depicts an exemplary user interface for displaying univariate parameter sensitivity values in a tabular format in an exemplary embodiment;

DETAILED DESCRIPTION

Embodiments of the present invention provide a virtual fabrication environment for semiconductor device fabrication that includes an analytics module for performing process window optimization. However, prior to discussing process window optimization and other features provided by embodiments, an exemplary 3D design environment/virtual fabrication environment into which an analytics module of the present invention may be integrated is first described.

Exemplary Virtual Fabrication Environment

Figure 1:
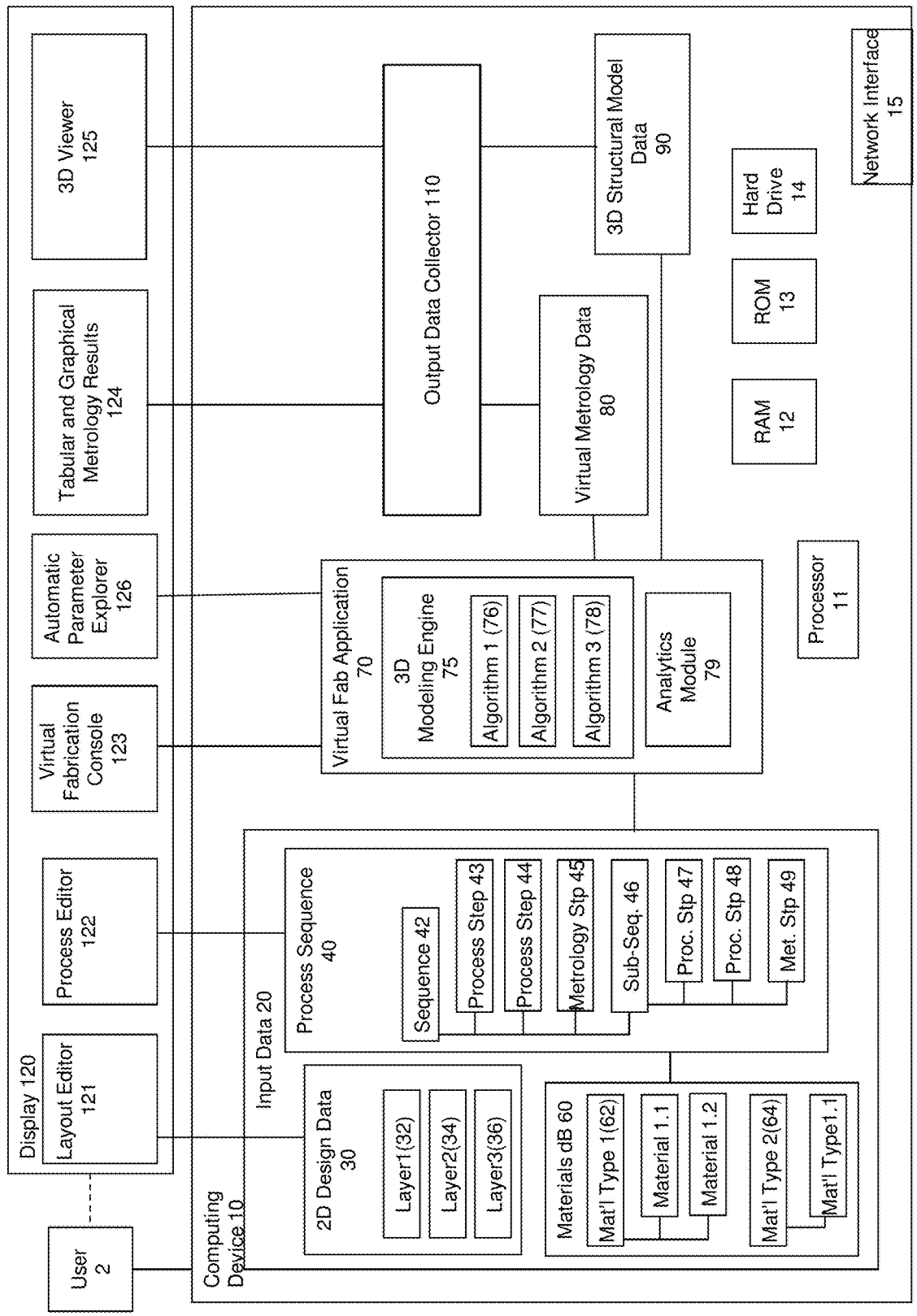
FIG. 1 depicts an exemplary virtual fabrication environment suitable for practicing an embodiment of the present invention.

FIG. 1 depicts an exemplary virtual fabrication environment 1 suitable for practicing an embodiment of the present invention. Virtual fabrication environment 1 includes a computing device 10 accessed by a user 2. Computing device 10 is in communication with a display 120. Display 120 may be a display screen that is part of computing device 10 or may be a separate display device or display surface in communication with computing device 10. Computing device 10 may be a PC, laptop computer, tablet computing device, server, or some other type of computing device equipped with one or more processors 11 and able to support the operations of virtual fabrication application, 70, 3D modeling engine 75 and analytics module 79 (described further below). The processor(s) may have one or more cores. The computing device 10 may also include volatile and non-volatile storage such as, but not limited to, Random Access Memory (RAM) 12, Read Only Memory (ROM) 13 and hard drive 14. Computing device 10 may also be equipped with a network interface 15 so as to enable communication with other computing devices. It will be appreciated that computing device 10 rather than being a solitary computing device may also be implemented as a computing system with multiple computing devices working in parallel or other combination.

Computing device 10 may store and execute virtual fabrication application 70 including 3D modeling engine 75. 3D modeling engine 75 may include one or more algorithms such as algorithm 1 (76), algorithm 2 (77), and algorithm 3 (78) used in virtually fabricating semiconductor device structures. 3D modeling engine 75 may accept input data 20 in order to perform virtual fabrication "runs" that produce semiconductor device structural model data 90. Virtual fabrication application 70 and 3D modeling engine 75 may generate a number of user interfaces and views used to create and display the results of virtual fabrication runs. For example, virtual fabrication application 70 and 3D modeling engine 75 may display layout editor 121, process editor 122 and virtual fabrication console 123 used to create virtual fabrication runs. Virtual fabrication application 70 and 3D modeling engine 75 may also display a tabular and graphical metrology results view 124 and 3D view 125 for respectively displaying results of virtual fabrication runs and 3D structural models generated by the 3D modeling engine 75 during virtual fabrication of semiconductor device structures. Virtual fabrication application 70 may also include analytics module 79 for performing analysis of 3D models including process window optimization as discussed further below.

Input data 20 includes both 2D design data 30 and process sequence 40. Process sequence 40 may be composed of multiple process steps 43, 44, 47, 48 and 49. As described further herein, process sequence 40 may also include one or more virtual metrology measurement process steps 45. Process sequence 40 may further include one or more subsequences which include one or more of the process steps or virtual metrology measurement process steps. 2D design data 30 includes of one or more layers such as layer 1 (32), layer 2 (34) and layer 3 (36), typically provided in an industry-standard layout format such as GDS II (Graphical Design System version 2) or OASIS (Open Artwork System Interchange Standard).

Input data 20 may also include a materials database 60 including records of material types such as material type 1 (62) and material type 2 (64) and specific materials for each material type. Many of the process steps in a process sequence may refer to one or more materials in the materials database. Each material has a name and some attributes such as a rendering color. The materials database may be stored in a separate data structure. The materials database may have hierarchy, where materials may be grouped by types and sub-types. Individual steps in the process sequence may refer to an individual material or a parent material type. The hierarchy in the materials database enables a process sequence referencing the materials database to be modified more easily. For example, in virtual fabrication of a semiconductor device structure, multiple types of oxide material may be added to the structural model during the course of a process sequence. After a particular oxide is added, subsequent steps may alter that material. If there is no hierarchy in the materials database and a step that adds a new type of oxide material is inserted in an existing process sequence, all subsequent steps that may affect oxide materials must also be modified to include the new type of oxide material. With a materials database that supports hierarchy, steps that operate on a certain class of materials such as oxides may refer only to the parent type rather than a list of materials of the same type. Then, if a step that adds a new type of oxide material is inserted in a process sequence, there is no need to modify subsequent steps that refer only to the oxide parent type. Thus hierarchical materials make the process sequence more resilient to modifications. A further benefit of hierarchical materials is that stock process steps and sequences that refer only to parent material types can be created and re-used.

3D Modeling Engine 75 uses input data 20 to perform the sequence of operations/steps specified by process sequence 40. As explained further below, process sequence 40 may include one or more virtual metrology steps 45, 49 that indicate a point in the process sequence during a virtual fabrication run at which a measurement of a structural component should be taken. The measurement may be taken using a locator shape previously added to a layer in the 2D design data 30. Alternatively, the measurement location may be specified by alternate means such as (x, y) coordinates in the 2D design data or some other means of specifying a location in the 2D design data 30 instead of through the use of a locator shape. The performance of the process sequence 40 during a virtual fabrication run generates virtual metrology data 80 and 3D structural model data 90. 3D structural model data 90 may be used to generate a 3D view of the structural model of the semiconductor device structure which may be displayed in the 3D viewer 125. Virtual metrology data 80 may be processed and presented to a user 2 in the tabular and graphical metrology results view 124.

Because of the large number of structural dimensions that are critical to the success of an integrated technology such as semiconductor devices, finding the relationship between the many inter-related process steps used to fabricate a device structure and the created structure is critical. As structural modifications produced by a step in the process sequence may be affected by previous and subsequent steps in the sequence, a particular step may affect a structural dimension in ways that are not obvious. A virtual fabrication environment enables automatic extraction of structural measurements from the device being created. The automatic extraction of a measurement is accomplished by specifying a virtual metrology measurement step in the process sequence at a point in the process when the measurement is critical. A locator shape for this virtual metrology measurement can be added to a layer in the design data and specified by the virtual metrology measurement step. The output data from this virtual metrology measurement can be used to provide quantitative comparison to other modeling results or to physical metrology measurements. This virtual metrology measurement capability is provided by during the processing sequence to extract a critical physical dimension at the correct point in the integrated process flow.

The ability to provide virtual metrology measurement data at specified locations in the device structure provides a significant improvement over conventional physical fab measuring techniques. Typically, physical in-fab measurements are done on specific characterization structures fabricated in the scribe lines or saw kerfs, adjacent to the product dice. In most cases, these characterization structures need to be designed to accommodate limitations of the measurement technique, such as optical spot size. Therefore, the characterization structures are not entirely representative of the actual structures on the product dice. Because of these differences, users of in-fab measurements usually face the challenge of inferring the result on the product structure from a measurement on a characterization structure. In the virtual fabrication environment, measurements can be added to any design layout at specified points in the process sequence thus providing greater insight into the effect of the inter-related process steps on the virtual structural model being constructed. As such, the in-fab challenge of measuring a characterization structure and inferring the result on a product structure is eliminated.

Figure 2:
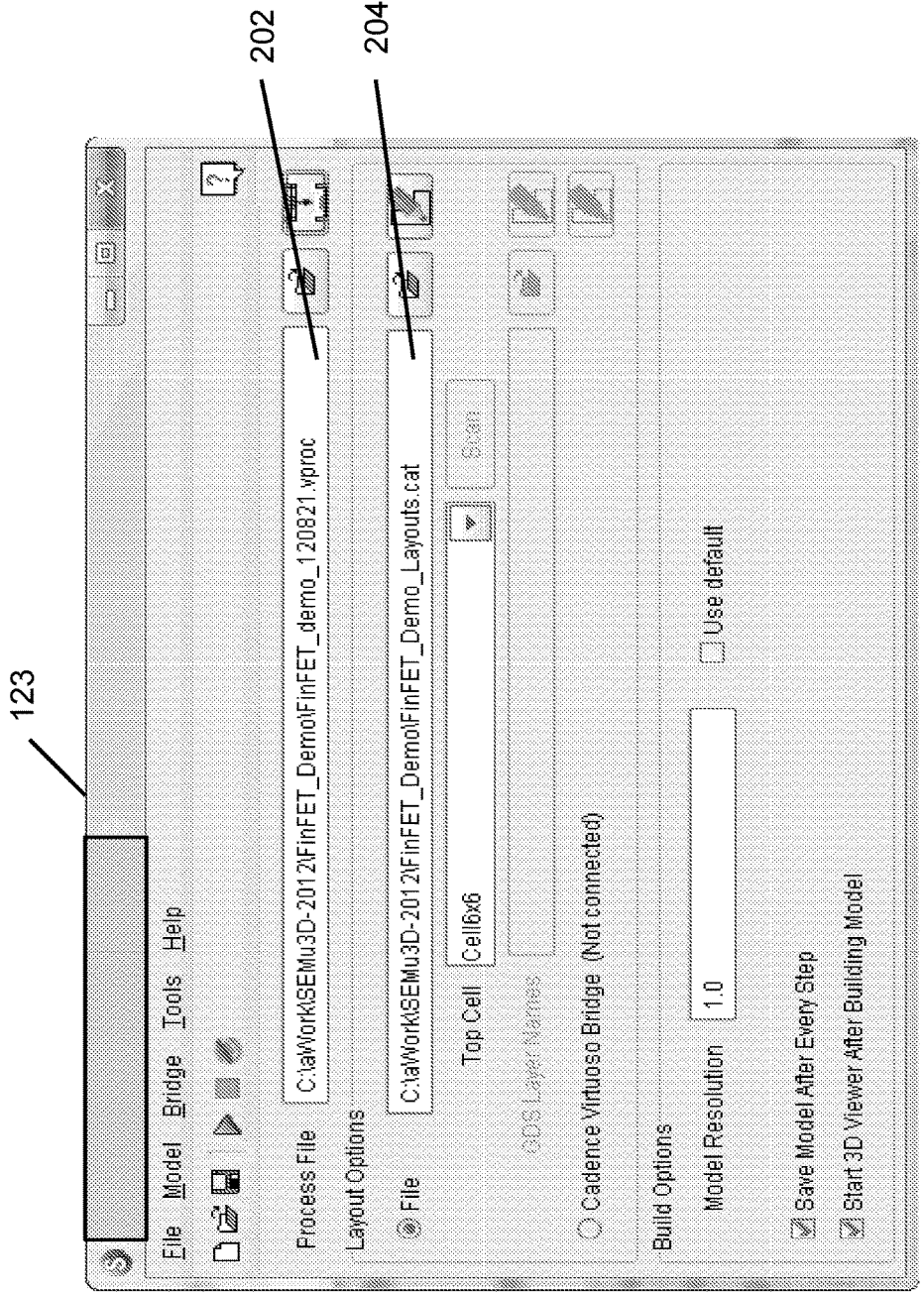
FIG. 2 depicts an exemplary virtual fabrication console in the virtual fabrication environment.

FIG. 2 depicts an exemplary virtual fabrication console 123 to set up a virtual fabrication run in the virtual fabrication environment. The virtual fabrication console 123 allows the user to specify a process sequence 202 and the layout (2D design data) 204 for the semiconductor device structure that is being virtually fabricated. It should be appreciated however that the virtual fabrication console can also be a text-based scripting console that provides the user with a means of entering scripting commands that specify the required input and initiate building of a structural model, or building a set of structural models corresponding to a range of parameter values for specific steps in the process sequence. The latter case is considered a virtual experiment (discussed further below).

Figure 3:
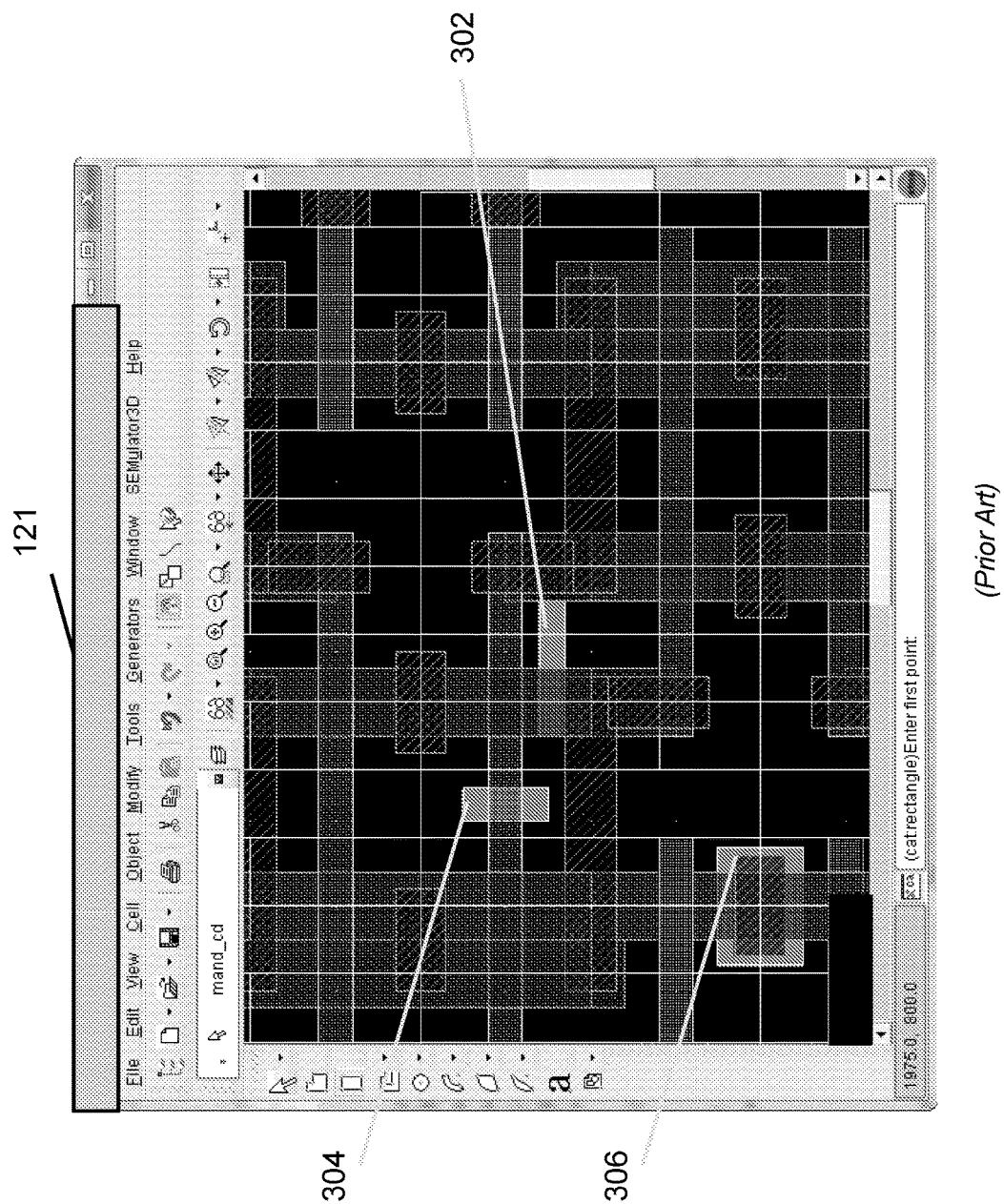
FIG. 3 depicts an exemplary layout editor in the virtual fabrication environment.

FIG. 3 depicts an exemplary layout editor in the virtual fabrication environment. The layout editor 121 displays the 2D design layout specified by the user in the virtual fabrication console 123. In the layout editor, color may be used to depict different layers in the design data. The areas enclosed by shapes or polygons on each layer represent regions where a photoresist coating on a wafer may be either exposed to light or protected from light during a photolithography step in the integrated process flow. The shapes on one or more layers may be combined (booleaned) to form a mask that is used in a photolithography step. The layout editor 121 provides a means of inserting, deleting and modifying a polygon on any layer, and of inserting, deleting or modifying layers within the 2D design data. A layer can be inserted for the sole purpose of containing shapes or polygons that indicate the locations of virtual metrology measurements. The rectangular shapes 302, 304, 306 have been added to an inserted layer (indicated by a different color) and mark the locations of virtual metrology measurements. As noted above, other approaches to specifying the locations for the virtual metrology measurements besides the use of locator shapes may also be employed in the virtual fabrication environment. The design data is used in combination with the process data and materials database to build a 3D structural model.

Figure 4:
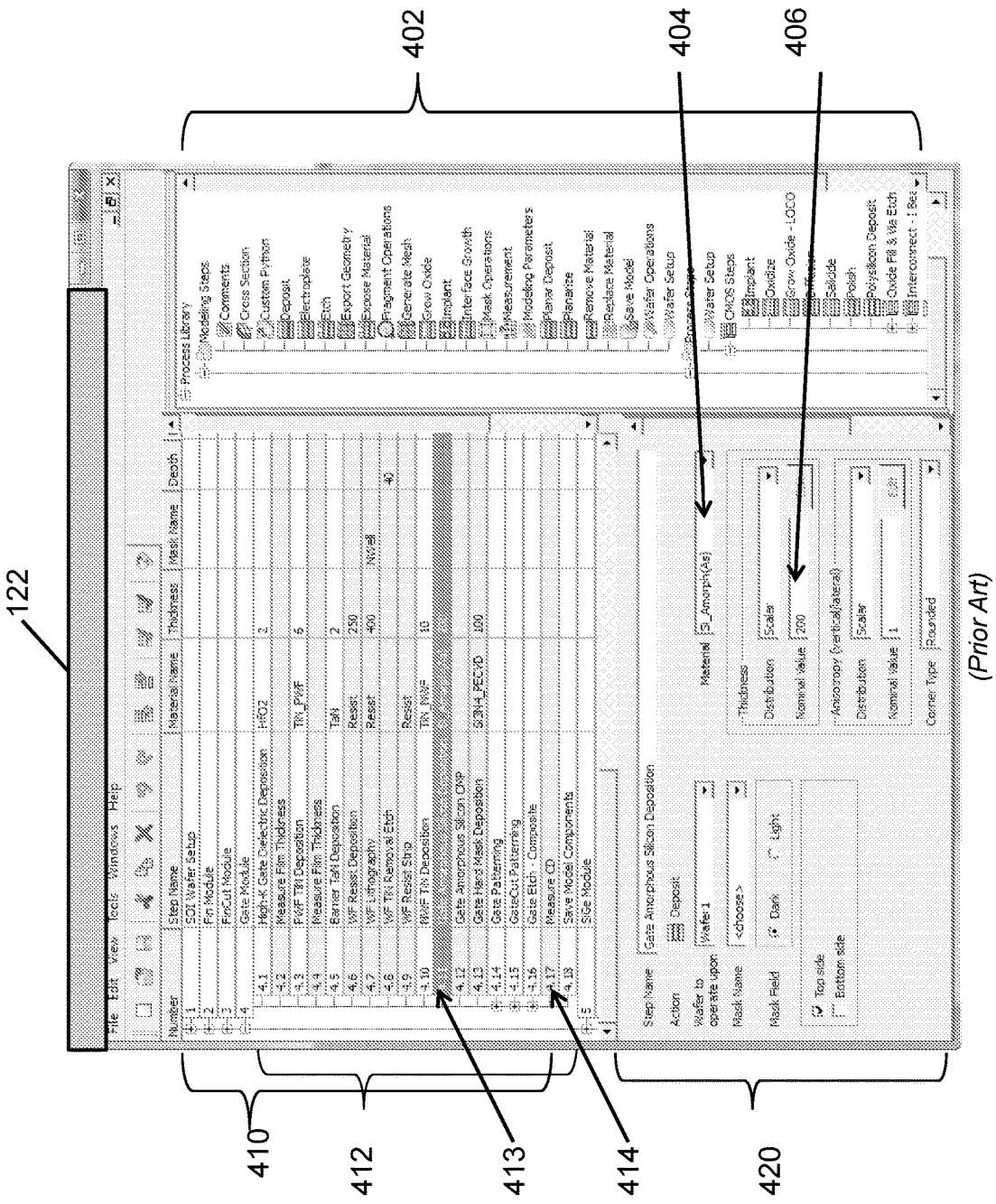
FIG. 4 depicts an exemplary process editor in the virtual fabrication environment.

Inserted layers in the design data displayed in the layout editor 121 may include inserted locator shapes. For example, a locator shape may be a rectangle, the longer sides of which indicate the direction of the measurement in the 3D structural model. For example, in FIG. 3, a first locator shape 302 may mark a double patterning mandrel for virtual metrology measurement, a second locator shape 304 may mark a gate stack for virtual metrology measurement and a third locator shape 306 may mark a transistor source or drain contact for virtual metrology measurement FIG. 4 depicts an exemplary process editor 122 in the virtual fabrication environment. The user defines a process sequence in the process editor. The process sequence is an ordered list of process steps conducted in order to virtually fabricate the user's selected structure. The process editor may be a text editor, such that each line or group of lines corresponds to a process step, or a specialized graphical user interface such as is depicted in FIG. 4. The process sequence may be hierarchical, meaning process steps may be grouped into sub-sequences and sub-sequences of sub-sequences, etc. Generally, each step in the process sequence corresponds to an actual step in the fab. For instance, a sub-sequence for a reactive ion etch operation might include the steps of spinning on photo resist, patterning the resist, and performing the etch operation. The user specifies parameters for each step or sub-step that are appropriate to the operation type. Some of the parameters are references to materials in the materials database and layers in the 2D design data. For example, the parameters for a deposit operation primitive are the material being deposited, the nominal thickness of the deposit and the anisotropy or ratio of growth in the lateral direction versus the vertical direction. This deposit operation primitive can be used to model actual processes such as chemical vapor deposition (CVD). Similarly, the parameters for an etch operation primitive are a mask name (from the design data), a list of materials affected by the operation, and the anisotropy.

There may be hundreds of steps in the process sequence and the process sequence may include sub-sequences. For example, as depicted in FIG. 4, a process sequence 410 may include a subsequence 412 made up of multiple process steps such as selected step 413. The process steps may be selected from a library of available process steps 402. For the selected step 413, the process editor 122 enables a user to specify all required parameters 420. For example, a user may be able to select a material from a list of materials in the material database 404 and specify a process parameter 406 for the material's use in the process step 413.

One or more steps in the process sequence may be virtual metrology steps inserted by a user. For example, the insertion of step 4.17 "Measure CD" (414), where CD denotes a critical dimension, in process sequence 412 would cause a virtual metrology measurement to be taken at that point in the virtual fabrication run using one or more locator shapes that had been previously inserted on one or more layers in the 2D design data. Inserting the virtual metrology steps directly in the fabrication sequence allows virtual metrology measurements to be taken at critical points of interest during the fabrication process. As the many steps in the virtual fabrication interact in the creation of the final structure, the ability to determine geometric properties of a structure, such as cross-section dimensions and surface area, at different points in the integrated process flow is of great interest to the process developer and structure designer.

Figure 5:
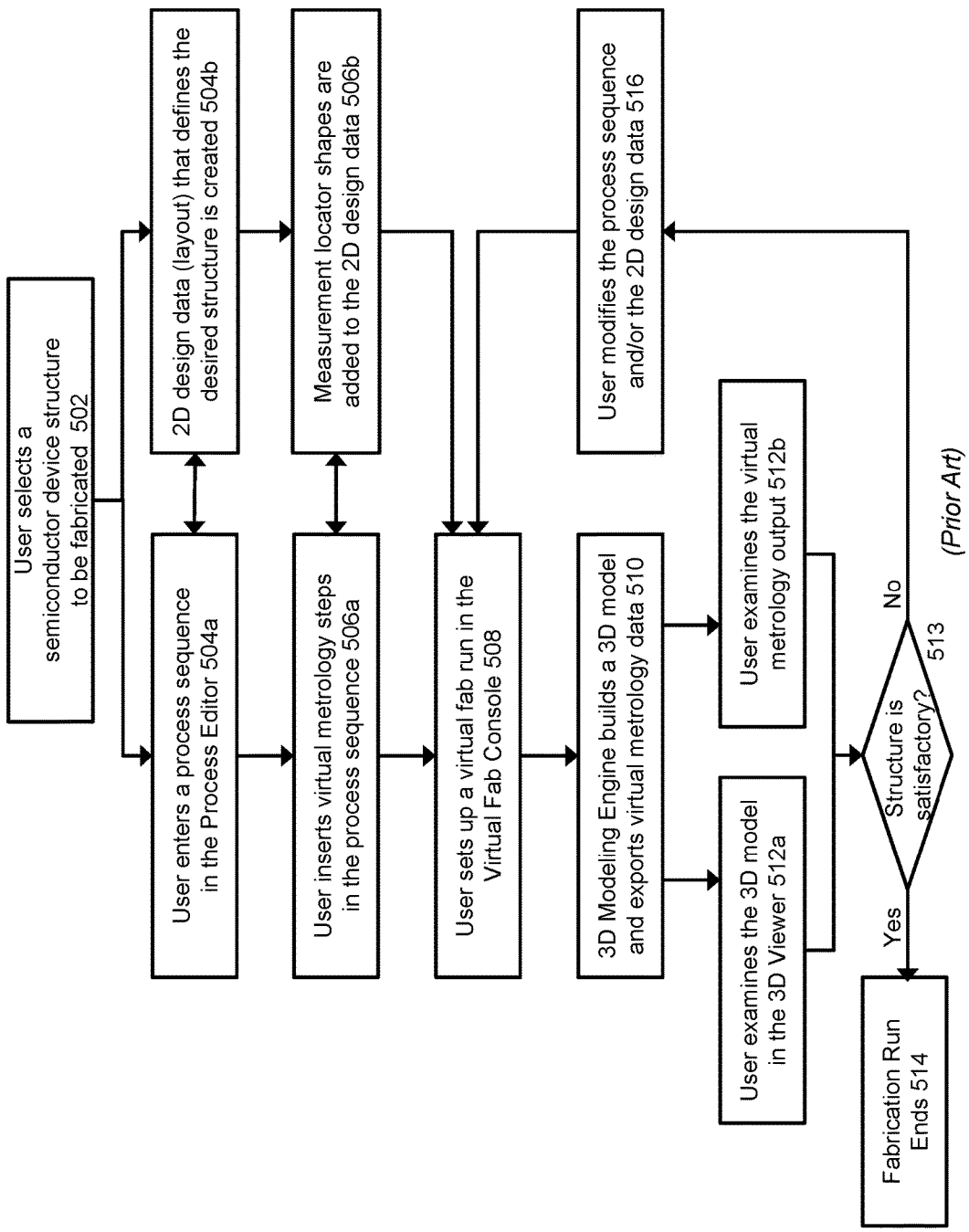
FIG. 5 depicts an exemplary sequence of steps in the virtual fabrication environment to generate virtual metrology measurement data.

FIG. 5 depicts an exemplary sequence of steps in the virtual fabrication environment to generate virtual metrology measurement data. The sequence begins with a user selecting a semiconductor device structure to be fabricated (step 502). The user may select from among multiple available sets of design data files and then select a rectangular region within the design data. For example the user may choose a FinFET or a passive resistor or a memory cell. Following the determination/selection of the structure to be fabricated, the user enters a process sequence in the process editor 122 (step 504*a*) and selects 2D design data that is expected to result in the desired structure (step 504*b*). Optionally, the user may create or modify design data in the layout editor 121. In the process editor, the user may insert one or more virtual metrology steps in the process sequence that specify a point during the virtual fabrication that the user would like virtual metrology measurements to be taken at specified locations in the evolving structure (step 506*a*). The user may insert locator shapes in the 2D design data displayed in the layout editor 121 that may be used by the virtual metrology step to perform its measurements (step 506*b*). The significance of a locator shape depends on the type of measurement requested. For example, the longer axis of a rectangular shape may indicate the direction and extent of a length measurement to be taken on a cross section of the structure, or the rectangle itself may designate a region where the contact area between two materials is to be measured. It will be appreciated that both above-described steps in the process editor may be performed before the steps in the layout editor or vice-versa in the virtual fabrication environment.

After the one or more locator shapes have been added to one or more layers in the 2D design data (step 506*b*) and the virtual metrology step(s) have been added to the process sequence (506*a*) the user sets up a virtual fabrication run using the virtual fabrication console 123 (step (508). During the virtual fabrication run, the process steps in the process sequence 40 are performed in the order specified by the 3D modeling engine 75. When the virtual fabrication reaches the virtual metrology step, a virtual "measurement" of the specified component in the structure being fabricated is performed. The computations done by the modeling engine depend on the nature of the measurement being requested, and are generally consistent with the analogous physical measurement technique in the fab. For example, critical dimension scanning electron microscope (CD-SEM) measurements in the fab locate sidewalls by detecting rapid changes in the orientation of the top surface of a structure. Similarly in a virtual metrology operation, the 3D modeling engine extracts the top surface of the structure in the region specified by a locator rectangle, interrogates the surface along its intersection with a plane defined by the intersection of the longer axis of the rectangle and the vertical axis for changes in slope that exceed a threshold (5 degrees, for example). Large changes in slope define faces of a feature, such as the bottom, top and sides of a ridge in the structure. Having established the locations of bottom, top and sides of a feature, the distance between the sides of the feature is computed at a vertical location (bottom, middle, or top) specified by the metrology step. The 3D modeling engine generates one or more types of output as it builds structural models. One type of output is the structural model itself, and may include its state at one or more points in the process sequence. The 3D model may be displayed to a user in the 3D viewer 125 (step 512*a*). The 3D modeling engine also exports the virtual metrology data (step 510). The virtual metrology data 80 may be exported to an automatic data analysis tool for further processing or may be displayed to a user through a user interface such as the tabular and graphical metrology results view 124 or other view (step 512*b*). If the structure when viewed or analyzed is satisfactory (step 513), the virtual fabrication run ends (step 514). If the structure created by the 3D modeling engine is unsatisfactory, the user modifies the process sequence and/or the 2D design data (step 516) and a new virtual fabrication run is set up (step 508).

Figure 6:
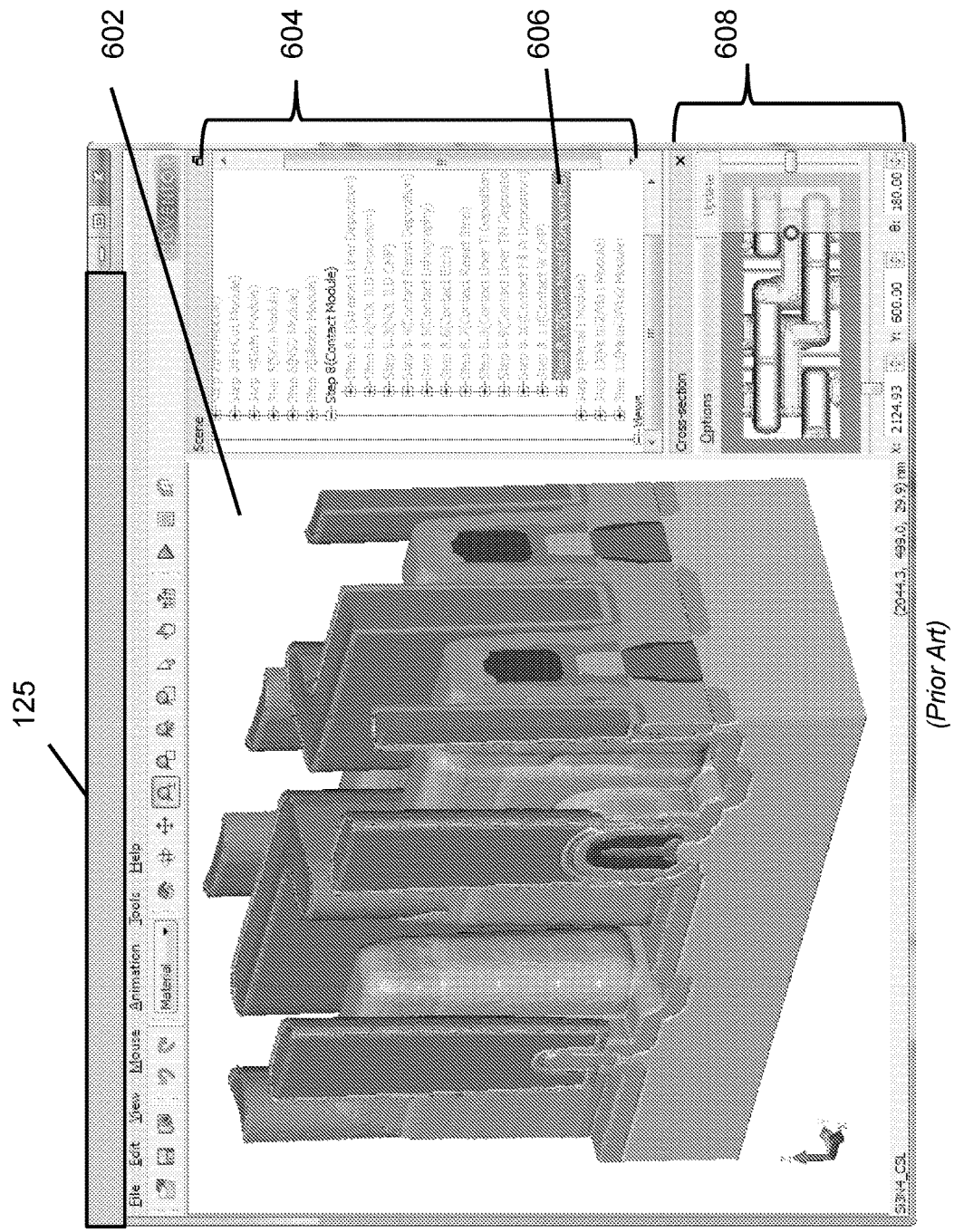
FIG. 6 depicts an exemplary 3D viewer in the virtual fabrication environment.

FIG. 6 depicts an exemplary 3D viewer 125 in the virtual fabrication environment. The 3D viewer 75 may include a 3D view canvas 602 for displaying 3D models generated by the 3D modeling engine 75. The 3D viewer 75 may display saved states 604 in the process sequence and allow a particular state to be selected 606 and appear in the 3D view canvas. The 3D Viewer provides functionality such as zoom in/out, rotation, translation, cross section, etc. Optionally, the user may activate a cross section view in the 3D view canvas 602 and manipulate the location of the cross section using a miniature top view 608.

Figure 7:
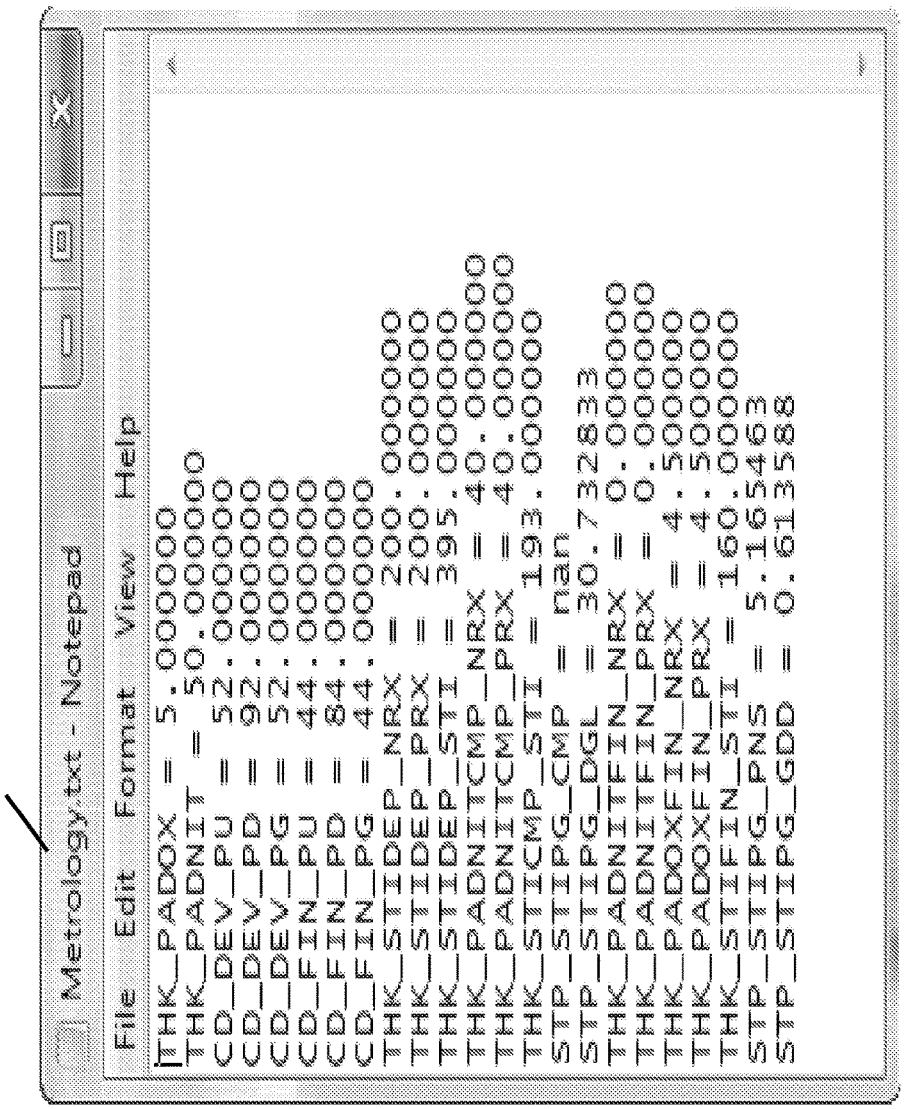
FIG. 7 depicts an exemplary display of virtual metrology measurement data in the virtual fabrication environment.

Another type of output from the 3D modeling engine 75 is the data produced by virtual metrology steps that are included in the process sequence. FIG. 7 depicts an exemplary display of virtual metrology measurement data 80 generated by multiple virtual metrology measurement steps in the virtual fabrication environment. The virtual metrology measurement result data 80 may be displayed in a tabular or graphical form including 2D X-Y plots and multi-dimensional graphics.

The techniques employed in the exemplary virtual fabrication environment are geometry-based. Calibration of the process step input parameters with actual experimental results from a physical fabrication to make virtual experiments more predictive is therefore advisable. Such calibration of the process steps results in improved modeling accuracy for all structures that comprise the full technology suite. Calibration can be executed on individual process steps from measurements, metrology or other physical characterization methods on characterization structures or product structures. Calibration may be conducted by comparing modeling results, including virtual metrology measurement data, to corresponding measurements or metrology conducted in the physical fab (on corresponding characterization or product structures), and subsequently adjusting modeling parameters such that the resulting virtually fabricated structures better match the physically fabricated structures. With proper calibration of modeling process parameters, the virtual fabrication environment becomes more predictive of the structures that result from physical fabrication throughout the entire allowed design space.

Figure 8:
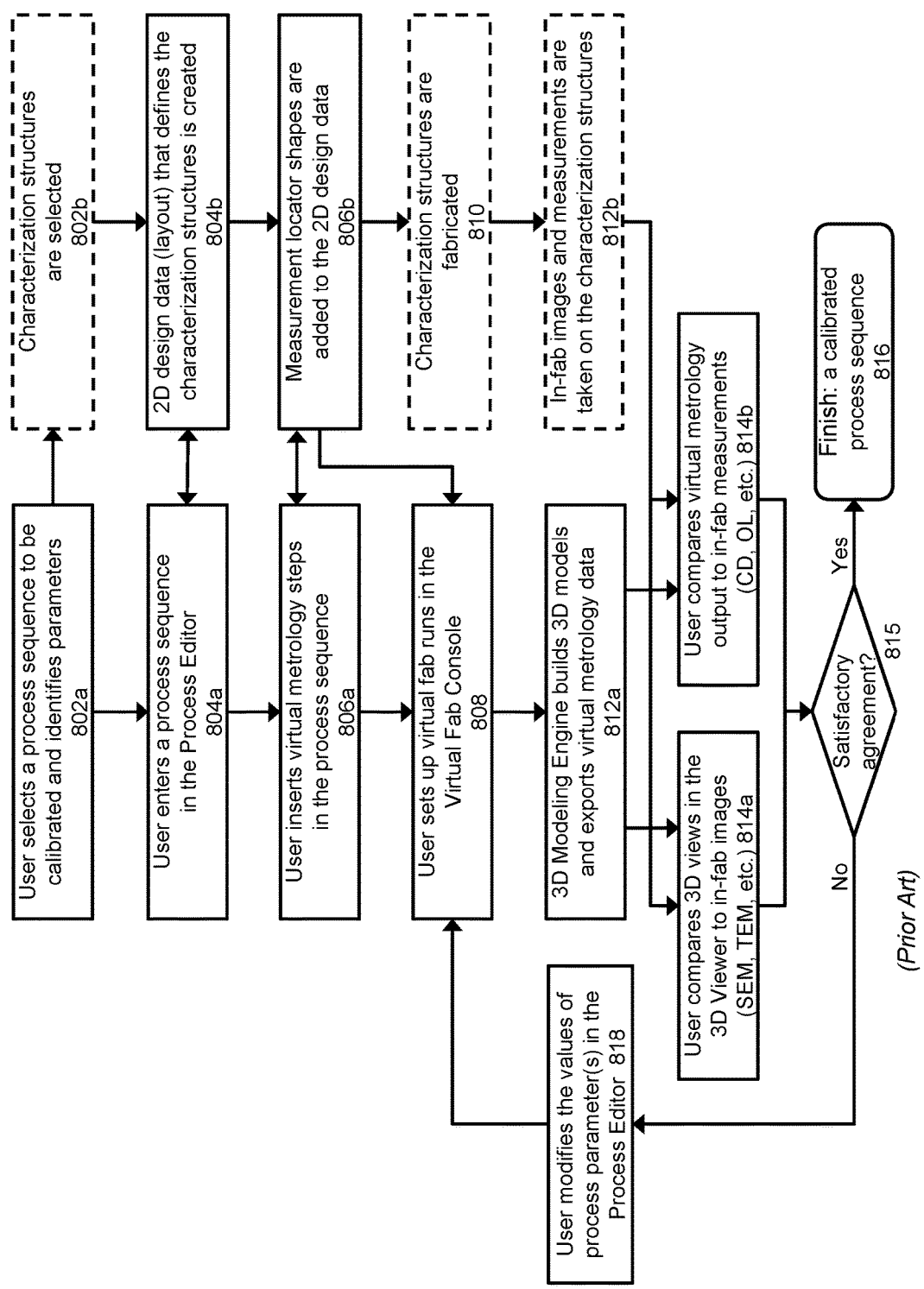
FIG. 8 depicts an exemplary sequence of steps in the virtual fabrication environment to calibrate a process sequence in a virtual fabrication environment.

FIG. 8 depicts an exemplary sequence of steps to calibrate a process sequence in a virtual fabrication environment. The sequence includes steps taken in both a virtual fabrication environment and a corresponding physical fab environment. In the virtual fabrication environment, the user selects a process sequence (for a structure to be virtually fabricated) to be calibrated and identifies related process parameters (step 802*a*). In the physical fab the user identifies a set of characterization or product structures for measurement during a fabrication run (step 802*b*). Back in the virtual fabrication environment the user enters the process sequence in the process editor (step 804*a*) and the 2D design data (layout) that defines the characterization structures is selected from available 2D design data or created for the purpose in the layout editor 121 (step 804*b*) The same design data is used for virtual fabrication and actual characterization. As discussed above, the user inserts one or more virtual metrology steps in the process sequence (step 806*a*) and adds measurement locator shapes to the 2D design data (step 806*b*). The user sets up a virtual fab run in the virtual fabrication console (step 808) and the 3D modeling engine builds the 3D model, and generates and exports virtual metrology data (step 812a). In parallel or offset with the virtual fabrication run, the physical fabrication environment creates the characterization or product structures (step 810) and in-fab images and measurements are taken on these structures (step 812b). The user may then compare the 3D views of the generated virtual model in the 3D viewer 75 to the in-fab images of the physical device structure (step 814a). Further, the set of characterization structure measurements may be compared to the virtual metrology measurements taken as a result of the virtual metrology step being inserted into the process sequence (step 814b). In most cases, this comparison is made by the user, but alternatively the comparison may be made by an automated data analysis tool based on pre-defined or interactively solicited criteria. If there is satisfactory agreement between the views and images and the virtual and actual measurements (step 815), the process sequence is considered calibrated (step 816). However, if there is not satisfactory agreement (step 815), the user modifies the values of the process parameters in the process editor (step 818) and a new virtual fabrication run is set up in the virtual fabrication console (step 808). The sequence then iterates until a satisfactory agreement is reached and calibration is achieved.

It should be appreciated that there may be a number of different parameters that may be calibrated within the sequence. Although the above description notes the use of the insertion of virtual metrology steps in the process sequence and the related use of the 2D locator shape or shapes to conduct the virtual metrology measurements, other techniques could be employed in the in a virtual fabrication environment. For example, the virtual measurements could be conducted on a virtual device structure after fabrication is completed and then compared to the physical measurements taken of the characterization structures during/after the physical fabrication run.

While building a single structural model can be valuable, there is increased value in virtual fabrication that builds a large number of models. A virtual fabrication environment may enable a user to create and run a virtual experiment. In a virtual experiment, a range of values of process parameters can be explored. A virtual experiment may be set up by specifying a set of parameter values to be applied to individual processes (rather than a single value per parameter) in the full process sequence. A single process sequence or multiple process sequences can be specified this way. The 3D modeling engine 75, executing in virtual experiment mode, then builds multiple models spanning the process parameter set, all the while utilizing the virtual metrology measurement operations described above to extract metrology measurement data for each variation. This capability may be used to mimic two fundamental types of experiments that are typically performed in the physical fab environment. Firstly, fabrication processes vary naturally in a stochastic (non-deterministic) fashion. As explained herein, a fundamentally deterministic approach used for each virtual fabrication run nevertheless can predict non-deterministic results by conducting multiple runs. A virtual experiment mode allows the virtual fabrication environment to model through the entire statistical range of variation for each process parameter, and the combination of variations in many/all process parameters. Secondly, experiments run in the physical fab may specify a set of parameters to be intentionally varied when fabricating different wafers. The virtual experiment mode enables the Virtual Fabrication Environment to mimic this type of experiment as well, by performing multiple virtual fabrication runs on the specific variations of a parameter set.

Each process in the fabrication sequence has its own inherent variation. To understand the effect of all the aggregated process variations in a complex flow is quite difficult, especially when factoring in the statistical probabilities of the combinations of variations. Once a virtual experiment is created, the process sequence is essentially described by the combination of numerical process parameters included in the process description. Each of these parameters can be characterized by its total variation (in terms of standard deviation or sigma values), and therefore by multiple points on a Gaussian distribution or other appropriate probability distribution. If the virtual experiment is designed and executed to examine all of the combinations of the process variations (multiple points on each Gaussian, for example the ±3 sigma, ±2 sigma, ±1 sigma, and nominal values of each parameter), then the resulting graphical and numerical outputs from virtual metrology steps in the sequence cover the total variation space of the technology. Even though each case in this experimental study is modeled deterministically by the virtual fabrication system, the aggregation of the virtual metrology results contains a statistical distribution. Simple statistical analysis, such as Root Sum Squares (RSS) calculation of the statistically uncorrelated parameters, can be used to attribute a total variation metric to each case of the experiment. Then, all of the virtual metrology output, both numerical and graphical, can be analyzed relative to the total variation metric.

In typical trial-and-error experimental practice in a physical fab, a structural measurement resulting from the nominal process is targeted, and process variations are accounted for by specifying an overly large (conservative) margin for the total variation in the structural measurement (total structural margin) which must be anticipated in subsequent processes. In contrast, the virtual experiment in the virtual fabrication environment can provide quantitative predictions of the total variation envelope for a structural measurement at any point in the integrated process flow. The total variation envelope, rather than the nominal value, of the structural measurement may then become the development target. This approach can ensure acceptable total structural margin throughout the integrated process flow, without sacrificing critical structural design goals. This approach, of targeting total variation may result in a nominal intermediate or final structure that is less optimal (or less aesthetically pleasing) than the nominal structure that would have been produced by targeting the nominal process. However, this sub-optimal nominal process is not critical, since the envelope of total process variation has been accounted for and is more important in determining the robustness and yield of the integrated process flow. This approach is a paradigm shift in semiconductor technology development, from an emphasis on the nominal process to an emphasis on the envelope of total process variation.

Figure 9:
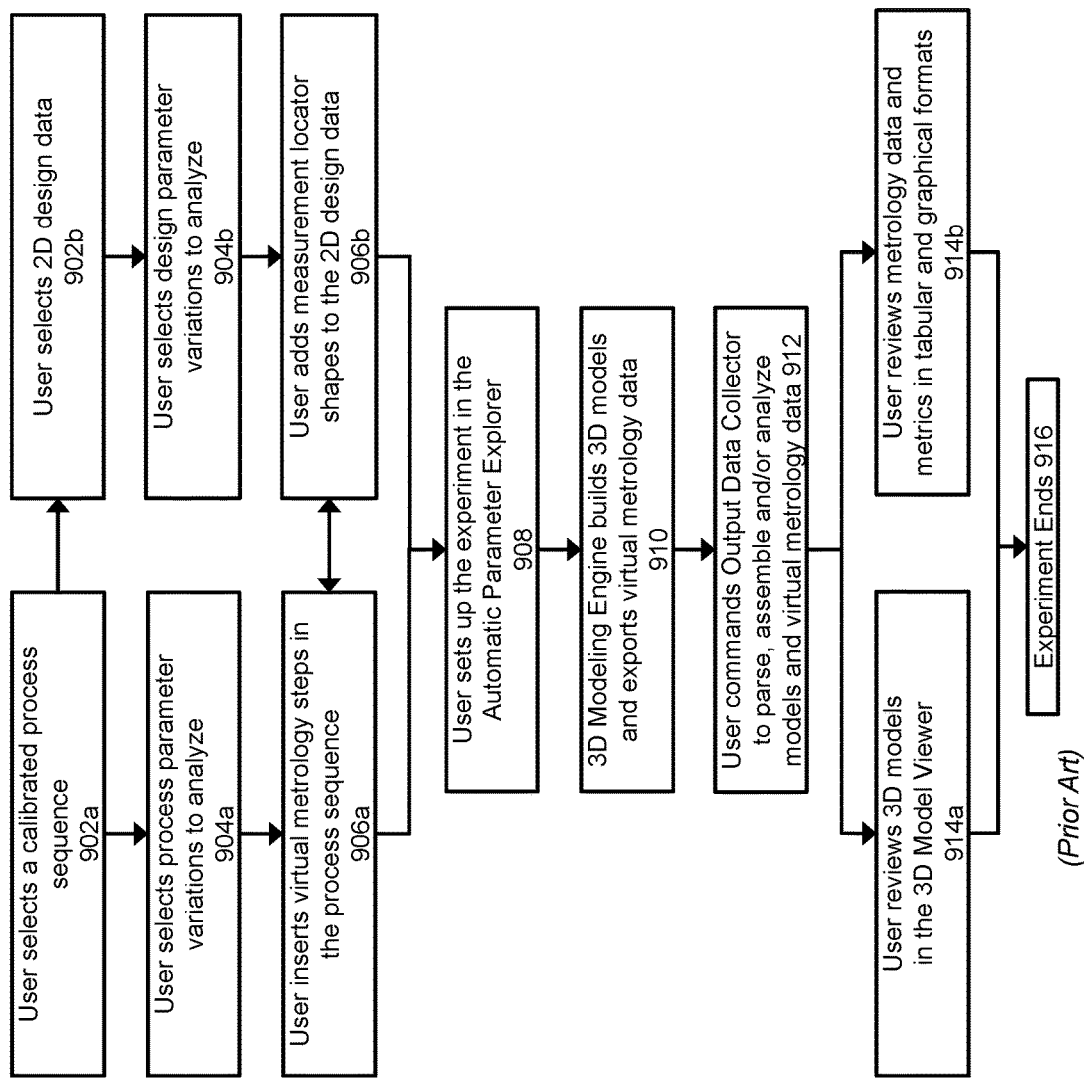
FIG. 9 depicts an exemplary sequence of steps to set up and perform a virtual experiment generating virtual metrology measurement data for multiple semiconductor device structure models in the virtual fabrication environment.
Figure 10:
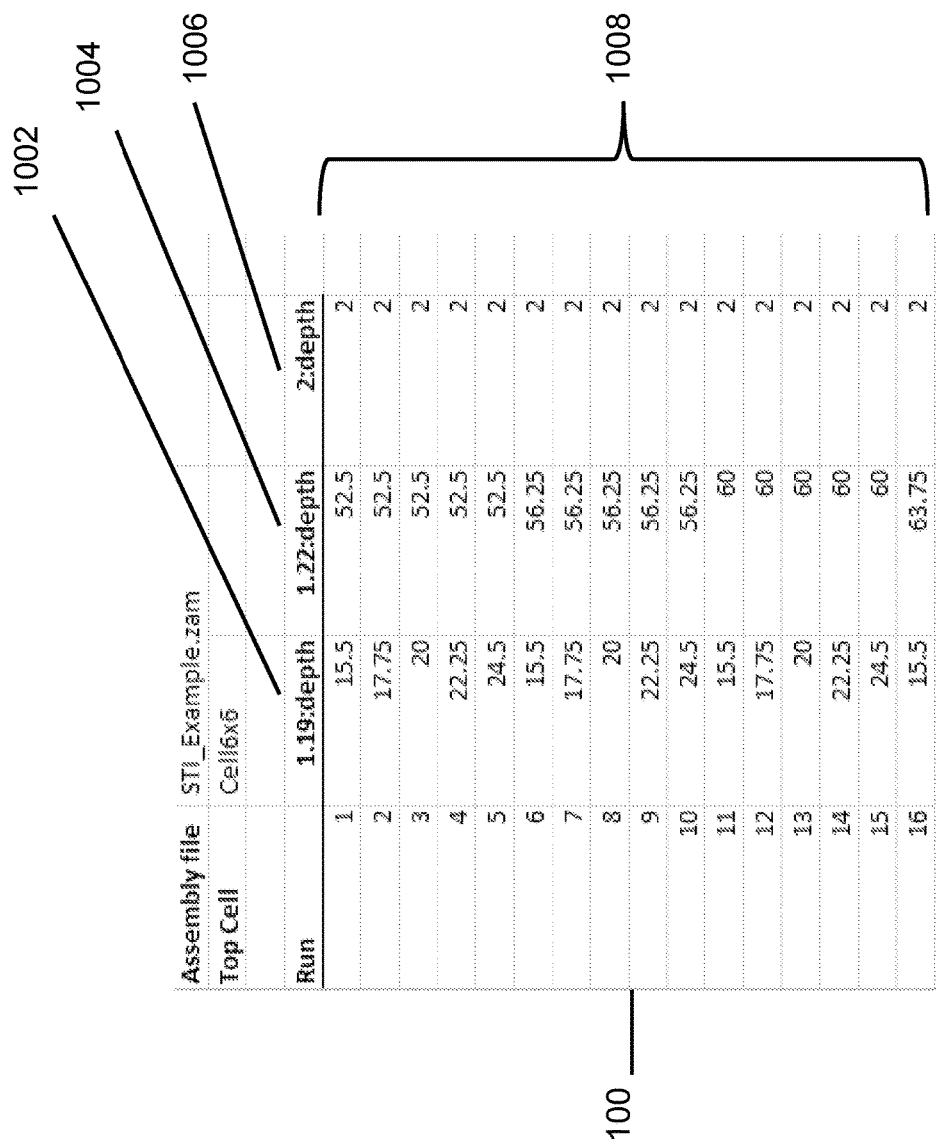
FIG. 10 depicts an exemplary parameter explorer view used to provide process parameters for a virtual experiment in the virtual fabrication environment.

FIG. 9 depicts an exemplary sequence of steps in the virtual fabrication environment to set up and perform a virtual experiment generating virtual metrology measurement data for multiple semiconductor device structural models. The sequence begins with a user selecting a process sequence (which may have been previously calibrated to make the results more structurally predictive (step 902a) and identifying/creating 2D design data (step 902b). The user may select process parameter variations to analyze (step 904a) and/or design parameter variations to analyze (step 904b). The user inserts one or more virtual metrology steps in the process sequence as set forth above (step 906a) and adds measurement locator shapes to the 2D design data (step 906b). The user may set up the virtual experiment with the aid of a specialized user interface, an automatic parameter explorer 126 (step 908). An exemplary automatic parameter explorer is depicted in FIG. 10 and may display, and allow the user to vary, the process parameters to be varied 1002, 1004, 1006 and the list of 3D models to be built with their corresponding different parameter values 1008. The parameter ranges for a virtual experiment can be specified in a tabular format. The 3D modeling engine 75 builds the 3D models and exports the virtual metrology measurement data for review (step 910). The virtual experiment mode provides output data handling from all Virtual Measurement/Metrology operations. The output data from the virtual metrology measurements may be parsed and assembled into a useful form (step 912).

With this parsing and assembling, subsequent quantitative and statistical analysis can be conducted. A separate output data collector module 110 may be used to collect 3D model data and virtual metrology measurement results from the sequence of virtual fabrication runs that comprise the virtual experiment and present them in graphical and tabular formats. FIG. 11 depicts an exemplary tabular-formatted display of virtual metrology data generated by a virtual experiment in the virtual fabrication environment. In the tabular formatted display, the virtual metrology data collected during the virtual experiment 1102 and the list of virtual fabrication runs 1104 may be displayed.

Figure 12:
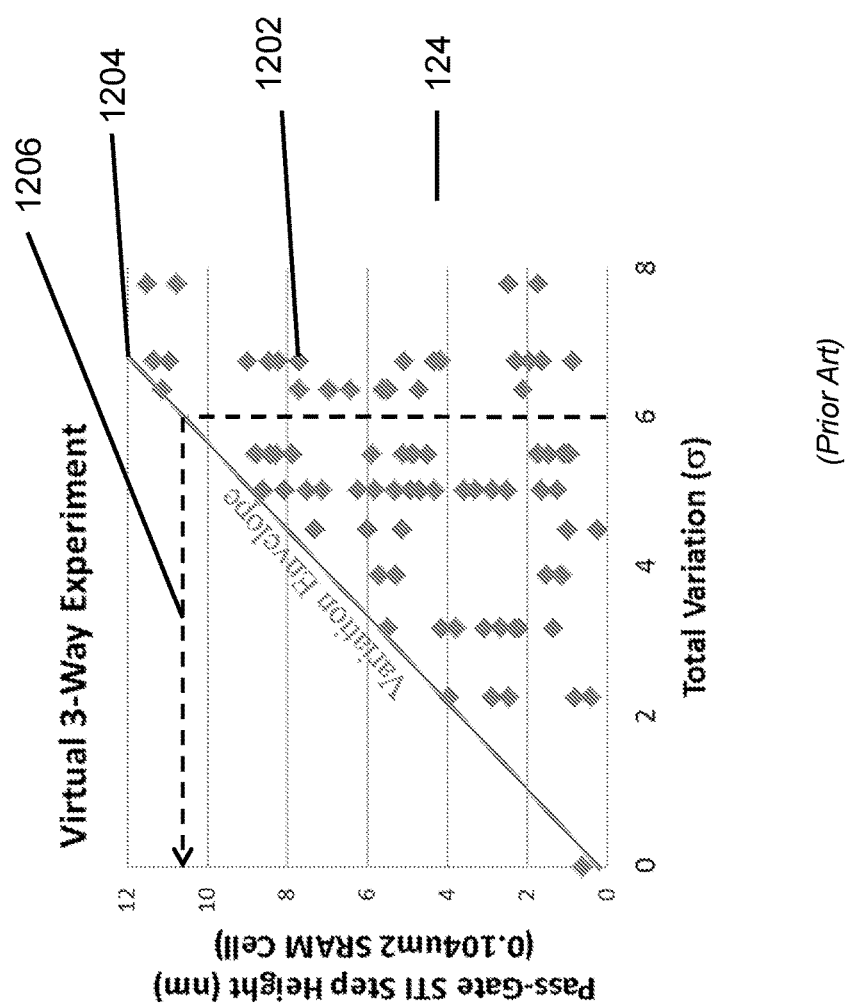
FIG. 12 depicts an exemplary graphical display of virtual metrology data generated in a virtual experiment in the virtual fabrication environment.

FIG. 12 depicts an exemplary 2D X-Y graphical plot display of virtual metrology data generated by a virtual experiment in the virtual fabrication environment. In the example depicted in FIG. 10, the total variation in shallow trench isolation (STI) step height due to varying 3 parameters in preceding steps of the process sequence is shown. Each diamond 1202 represents a virtual fabrication run. The variation envelope 1204 is also displayed as is the depicted conclusion 1206 that the downstream process modules must support approximately 10.5 nm of total variation in STI step height to achieve robustness through 6 sigma of incoming variation. The virtual experiment results can also be displayed in multi-dimensional graphic formats.

Once the results of the virtual experiment have been assembled, the user can review 3D models that have been generated in the 3D viewer (step 914a) and review the virtual metrology measurement data and metrics presented for each virtual fabrication run (step 914b). Depending on the purpose of the virtual experiment, the user can analyze the output from the 3D modeling engine for purposes of developing a process sequence that achieves a desired nominal structural model, for further calibrating process step input parameters, or for optimizing a process sequence to achieve a desired process window.

The 3D modeling engine's 75 task of constructing multiple structural models for a range of parameter values (comprising a virtual experiment) is very compute intensive and therefore could require a very long time (many days or weeks) if performed on a single computing device. To provide the intended value of virtual fabrication, model building for a virtual experiment must occur many times faster than a physical experiment. Achieving this goal with present day computers requires exploiting any and all opportunities for parallelism. The 3D modeling engine 75 uses multiple cores and/or processors to perform individual modeling steps. In addition, the structural models for different parameter values in a set are completely independent and can therefore be built in parallel using multiple cores, multiple processors, or multiple systems.

The 3D modeling engine 75 in the virtual fabrication environment may represent the underlying structural model in the form of voxels. Voxels are essentially 3D pixels. Each voxel is a cube of the same size, and may contain one or more materials, or no materials. Those skilled in the art will recognize that the 3D modeling engine 75 may also represent the structural model in other formats. For instance, the 3D modeling engine could use a conventional NURBS-based solid modeling kernel such as is used in 3D mechanical CAD tools, although modeling operations based on a digital voxel representation are far more robust than the corresponding operations in a conventional analog solid modeling kernel. Such solid modeling kernels generally rely on a large number of heuristic rules to deal with various geometric situations, and modeling operations may fail when the heuristic rules do not properly anticipate a situation. Aspects of semiconductor structural modeling that cause problems for NURBS-based solid modeling kernels include the very thin layers produced by deposition processes and propagation of etch fronts that results in merging faces and/or fragmentation of geometry.

The virtual fabrication environment may enable the performance of a multi-etch process that is included in the process sequence which allows the 3D modeling engine 75 to model a wide-range of process and material-specific etch behavior. Patterning operations in process flows for highly scaled semiconductor devices are frequently performed using plasma etches. Plasma etches are known by many different names: dry etch, reactive ion etch (RIE), inductively coupled plasma (ICP) etch, etc. A wide variety of operating conditions and chemistry allows process engineers to fine-tune plasma etch behavior to selectively achieve diverse etch physics in multiple different classes of materials. This behavioral flexibility is key to achieving a desired 3D structure when patterning through several layers of material. Several different types of physics are typically involved, including but not limited to: chemical etching, sputtering, deposition or re-deposition of polymeric material, electrostatic charging, electrostatic focusing, and shadowing. This diverse spectrum of physics produces a commensurate range of etch behavior and hence structural shapes.

Directly simulating the physics involved in plasma etches with sufficient accuracy is extremely difficult and slow. The multi-etch process step avoids the difficulties of physics-based simulations by simulating plasma etches using a reduced set of behavioral parameters that are specific to the type of etch and the material being etched. This allows the capture of a wide range of physical etch behavior without the need to directly simulate the physics of the etch process. For example, three main types of etch behavior may be simulated: isotropic, taper, and sputtering. A fourth type of etch behavior, shadowing, can optionally also be simulated.

Basic (isotropic) behavior is caused (physically) by chemical etching and results in material being removed at a similar rate in all directions from the point on the etchable surface, regardless of the local orientation of the etchable surface. Basic behavior may be modeled with a single input parameter, "lateral ratio", that controls the ratio between the lateral and vertical etch rates. For example, a lateral ratio value of one (1.0) indicates that the etch rate is uniform in all directions. A lateral ratio value less than one indicates that the etch rate in the lateral direction (on vertical surfaces) is slower than the etch rate in the vertical direction (on horizontal surfaces).

Taper behavior is caused (physically) by a combination of directional etch behavior and polymer deposition. The polymer deposition occurs as a side effect of a directional etch process. During a directional etch process that etches horizontal surfaces much faster than vertical surfaces, polymer may accumulate on near-vertical surfaces. This competition between etching and deposition results in tapered sidewall profiles. Taper behavior may be modeled with a single input parameter, the taper angle. A taper angle describes the critical angle at which deposition and etch rates are balanced. An optional second parameter, the lateral ratio, has the same meaning as defined above for basic behavior.

Sputter behavior refers to direct physical removal of material through bombardment by energetic ions and results in preferential removal of protruding edges (convex edges) and in some cases corners. Sputtering may be modeled with two parameters: the angle of maximum sputter yield, and the rate of sputter relative to the rate of vertical etching.

Shadowing refers to a reduction in directional ion flux caused by a local elevation change, effectively reducing etch rates for some structures. This effect can be significant in some cases, resulting in differing etch rates across a cell. Shadowing may be modeled using a single parameter to describe angle of incidence of the energetic ions relative to a vertical axis.

To model a multi-material, multi-physics etch, the input parameters described above must be formed into a suitable numerical modeling algorithm in the virtual fabrication environment. The numerical modeling algorithm includes single material and multi-material speed functions and a surface evolution technique. A single-material speed function defines the etch speed as a function of local surface orientation (i.e., surface normal direction) and is determined empirically in order to produce the desired etch behavior. Note also that a single-material speed function may combine multiple types of etch behavior; for example, both taper and sputter etching include the parameters associated with basic (isotropic) etching. A multi-material speed function is a combination of single-material speed functions, and calculates the local etch speed as a function of both local surface orientation and local material type. The Etch Ratio parameter defines the relative etch rates of etchable materials and is a multiplication factor on the single-material speed.

With the speed function defined, a suitable surface evolution technique may be used to locate and evolve the position of the etchable surface in three dimensions. The etchable surface is advected or moved in its local normal direction according to the local scalar speed determined by evaluating the speed function. The scalar speed must be calculated at points of interest on the etchable surface and must be periodically re-calculated as the geometry of the etchable surface evolves.

A number of different types of surface evolution techniques may be utilized by the numerical algorithm for simulating the multi-etch process in the virtual fabrication environment. The moving surface may be represented using any suitable numerical spatial discretization. Explicit front tracking methods may be used: examples include string methods, point-and-line methods (2D) and polygon surfaces (3D). An alternate implicit surface representation, such as distance fields, volume of fluid or voxels, may also be used. Any suitable time-dependent numerical technique may be used to advance the moving surface in time.

A selective epitaxy process may be included in a process sequence used to virtually fabricate a semiconductor device structure. The selective epitaxy process virtually models epitaxial growth of a crystalline material layer on top of a crystalline substrate surface of a semiconductor device structure. Selective epitaxy is widely used in contemporary semiconductor process flows, often for the purpose of imparting mechanical stress on the transistor channel to improve performance. A key characteristic of epitaxial growth is its dependence on crystal directions. Semiconductor devices are normally fabricated on single crystal silicon wafers; i.e., silicon material with atoms arranged in a repetitive crystal lattice structure that is continuous over the majority of the wafer. Silicon crystal structure is anisotropic (i.e., not symmetric in all directions), and silicon surfaces are more stable in several particular crystal directions. These directions are defined by the major crystal plane families, identified as <100>, <110> and <111> using their Miller indices, and have the strongest impact on growth characteristics. By varying the pressure, temperature and chemical precursors in the epitaxy process, engineers can control the relative growth rates of the three major planes. Growth rates on minor planes, for example <211>, <311>, <411>, also vary but often are not influential in determining the final shape of an epitaxially grown structure.

The virtual fabrication environment may use a surface evolution algorithm to model epitaxial growth. The surface upon which epitaxial growth is occurring (the growing surface) is advected or moved according to a scalar advection speed. The growth rate is calculated at selected points based on the local surface normal direction and fixed input parameters, is local in both distance and time, and moves the surface in its normal direction. The growing surface may be represented using any suitable numerical spatial discretization. Explicit front tracking methods may be used: examples include string methods, point-and-line methods (2D) and polygon surfaces (3D). An alternate implicit surface representation, such as distance functions, volume of fluid or voxels, may also be used. Any suitable time-dependent numerical technique may be used to advance the growing surface in time.

The selective epitaxy process in the virtual fabrication environment utilizes the growth rates of the three major plane families, <100>, <110> and <111> as fixed input parameters. These input parameters define the growth rate for surfaces that are aligned with any one of their associated planes. Further input parameters may include growth rates on neighboring non-crystalline materials. The relationship between the 3D modeling coordinate system and the crystal lattice of the wafer may also be considered when calculating the epitaxial growth rate. The 3D modeling coordinate system normally uses the same X and Y axes as the 2D design data and the Z axis is normally perpendicular to the surface of the wafer. Alternate coordinate systems may also be employed. On a real wafer, the orientation of the crystal lattice is indicated by a "flat" or "notch" on the edge of the otherwise circular wafer. The notch may be used as a reference to orient the 2D design data in the desired direction relative to the crystal lattice. Input parameters specifying the notch (or flat) type and direction may define the orientation of the crystal lattice and associated crystal planes of the wafer relative to the 2D design data. It should be noted that this relationship can be described as a coordinate transformation between the 3D model coordinate system and the coordinate system of the crystal lattice.

Using the growth rates for the major plane families and knowing the orientation of the crystal lattice, the epitaxial growth rate may be calculated everywhere on the growing surface. Areas of the growing surface with a normal direction that is aligned with a major plane direction are assigned the speed of that major plane. For areas of the growing surface that are not aligned with a major plane direction, an appropriate speed must be found by interpolating between neighboring major plane directions. Further, the behavior of the epitaxial growth at the boundaries of the crystalline material can also be important. Epitaxial growth is often performed after several prior processing steps in which non-crystalline materials have been deposited and patterned. These non-crystalline materials may be adjacent to crystalline material and hence in close proximity to epitaxial growth. Examples of non-crystalline neighboring materials are silicon dioxide, silicon nitride, or any other materials common in semiconductor processing. In some cases, epitaxial growth slowly creeps along adjacent non-crystalline material (overgrowth) but in other cases it does not. Overgrowth behavior may be modeled with fixed input parameters defining the set of neighboring materials on which overgrowth occurs (overgrowth materials), as well as the speed at which the growing surface creeps along the overgrowth materials. The overgrowth speed modifies the epitaxial growth rate at the surface of the overgrowth materials such that the growing surface moves along the overgrowth material at the specified speed. In addition, the speed at which the growing surface moves along the overgrowth material may depend on the angle between the overgrowth material surface and the growing surface. The overgrowth speed may be ignored if the angle between the two surfaces is greater than a threshold angle.

Design Rule Checks (DRCs) or Optical Rule Checks (ORCs) may be performed in the virtual fabrication environment. DRCs and ORCs have typically been performed by specialized software on 2D design data as part of the process of preparing 2D design data for conversion into photolithography masks. Such checks are performed for purposes of identifying errors in the layout that would result in non-functional or poorly functioning chips. The checks are also performed after adding compensations for optical effects such as optical proximity correction (OPC). Typical design rules (as published in design manuals and coded in DRC decks) are simple 2D criteria intended to prevent problems that are fundamentally 3D in nature. However, with the growing complexity of semiconductor process technology, design manuals have blossomed into thousand-page documents with thousands of 2D design rules to codify and explain. In many cases, a single 3D failure mechanism/concern can drive hundreds of 2D design rules. The development of those 2D design rules requires significant assumptions about the 3D nature of the integrated process flow and resulting structures.

2D DRCs are developed from relatively simple calculations that may result in overly conservative designs. For example, consider the 2D design rules required to assure a minimum contact area between a line on a metal interconnect layer and an underlying via. A via is a vertical, electrically conductive connector between two interconnect layers, also called metal layers, or a vertical connector between an interconnect layer and a device such as a transistor, resistor or capacitor.

Many additional 2D DRCs are required to satisfy a criterion that is very simple to state in 3D: that the contact area between metal lines and vias must exceed a specified threshold value. The 2D DRC situation becomes even more complex when one considers that multiple manufacturing variations can affect the contact area, including over or under-exposure during lithography steps, mis-registration of the masks, planarization (via chemical mechanical polishing (CMP)) of the via layer, and the sidewall tapers produced by plasma etching. It is infeasible to include all of these statistical variations in the simple formulae that drive 2D DRCs, so the DRCs are stricter than necessary to guard against manufacturing variations. These overly strict 2D DRCs may result in sub-optimal designs with wasted area on the die.

In contrast to a 2D DRC environment, a virtual fabrication environment may perform checks, such as minimum line width, minimum space between features, and minimum area of contacts, directly in 3D without making assumptions about the translation from 2D to 3D. Checks performed directly in 3D are referred to herein as "3D DRCs". One benefit of 3D DRC is that the required number of checks is significantly smaller than the number required in 2D environments. As a result, the checks are more robust and easier to develop than 2D checks. Furthermore, with a much smaller set of 3D rules, the virtual fabrication environment can perform the checks for a range of statistical variations in process parameters.

It should be appreciated that 3D-DRCs are distinct from virtual measurement/metrology operations that may also be performed in the virtual fabrication environment. The virtual measurement metrology operations mimic actual measurement and metrology operations in the fab, whereby a measurement location is specified and a metric such as a distance value or area is output. For 3D DRCs, on the other hand, a geometric criterion is specified and the location and value of the criterion are desired. That is, the location is an output of the 3D DRC operation rather than an input. For example, a virtual metrology operation may specify an oxide film thickness measurement at a specific location indicated by a locator in the 2D design data, whereas a 3D DRC for minimum layer thickness may request the location(s) anywhere in the 3D model where the oxide film thickness is less than a specified threshold value. The 3D structural model may then be searched for locations where the specified minimum dimensional criteria are satisfied. Similarly, a 3D DRC may also cause the structural model to be searched to see if a maximum dimensional criterion is satisfied. 3D DRCs of this type thus provide benefits unavailable with virtual measurement/metrology operations for identifying unexpected causes of failures.

Examples of 3D-DRCs include:
Electrical Net Isolation: finds the shortest distance between selected conductors. A conductor is a lump that may be comprised of one or more conducting materials (a "lump" is a discrete volumetric region (technically, a 3-manifold) within a 3D structural model. A lump may be composed of a single material or multiple materials);
Minimum Separation: finds the shortest distance between any pair in a group of selected lumps;
Minimum Line Width, finds the shortest distance through any lump in a group of selected lumps;
Minimum Layer Thickness, finds the shortest distance through any lump in the collection of lumps that comprise a layer of material;
Minimum Contact Area: finds the smallest contact area between all pairs of selected lumps.

Lumps may be selected on the basis of constituent material(s), electrical conductivity or other properties. Each of the 3D DRC checks can be extended by specifying a threshold value. For example, specifying a threshold value for a Minimum Line Width check produces a list of locations where the minimum line width is less than the threshold value. Those skilled in the art will recognize that other checks of this nature may be defined.

Analytics Module

In one embodiment, the virtual fabrication environment includes an analytics module. The analytics module is designed to mimic the workflows in use cases encountered by semiconductor process integrators. Exemplary use cases encountered by semiconductor process integrators and addressed by the analytics module may include but are not limited to, key parameter identification, process model calibration, variability analysis and process window optimization. In key parameter identification, the analytics module may find process steps/parameters that most strongly influence an outcome (calibration, defect mode, etc.). In process model calibration, the process parameters may be adjusted to make the 3D model match measurements from a physical fab, such as, but not limited to, Transmission Electron Microscopy (TEM) data or a process target. In variability analysis, the analytics module may assist the user in analyzing and understanding the variability in metrology data obtained for a set of virtual 3D models such as by, but not limited to, estimating variability in structural or electrical parameters for specification limit setting. In process window optimization, the analytics module may analyze and display information in the virtual fabrication environment to help a user understand the sensitivity of the yield of the POR to parameter nominal values and window sizes and to assist the user in assessing yield improvement scenarios when adjusting parameter nominals and allowed ranges, starting from the POR.

In one embodiment, the analytics module is integrated into the virtual fabrication environment resulting in improved and new functionality not available via third party statistical solutions. In an embodiment, the UI and algorithms may be organized by use cases and follow a left-side UI, step-wise flow for each use case. This design may strongly guide the user (who may lack statistical training) to perform correct analysis steps so that they avoid mistakes in the analysis. The analytics module may also include a statistical analysis engine that employs a set of analysis algorithms to correctly analyze each specific use case. Results of the analysis may be provided and/or displayed to a user or to third party software in a number of formats.

Inputs to the analytics module may include, but are not limited to, selection of the type of analysis, which may be organized by use case (e.g. identifying key parameters, optimization, calibration, variability analysis and process window optimization). Additional exemplary inputs may include process parameters of interest (e.g. specified as nominal values and/or ranges) and targets of interest (e.g.: metrology values, structure searches, DTC checks, electrical analysis values). In one embodiment, an input value may be a reference to a 3D model file. In some embodiments, the analytics module may perform run list generation to set up an experimental Design of Experiments (DOE) (e.g. a screening D.O.E., a full factorial D.O.E., a Monte Carlo simulation) followed by run list execution and may utilize cluster computing to increase efficiency during execution. Outputs from execution may include outlier detection and statistical analysis results such as determining parameter significance/ranking. Outputs may also include exploratory graphs (e.g. bivariate plots, response surface) and indirect optimization. In one embodiment results may also be exported to third party tools for further analysis.

D.O.E. is a methodology for calculating the number of experiments at specific combinations of parameters settings such that more information is gained for less experimental effort. Monte Carlo simulation is a D.O.E. option that allows for random generation of parameter settings using normal or uniform distributions. As described further below, in the case of process window optimization, in one embodiment the parameter settings are generated with a normal distribution. In an embodiment, the UI allows the user to input means and standard deviations for normally distributed parameters, or minima and maxima for uniformly distributed parameters, and random values are generated accordingly. In one embodiment as a parameter for the D.O.E., the user may also enter the number of virtual fabrication runs desired.

Process Window Optimization

Determining the highest possible yield is important for all steps of the semiconductor manufacturing process in order for the manufacturer to increase their chances of making a profit after accounting for the expensive costs of running a fab. Only die that pass final test are sold, while the others represent economic losses. Overall Yield may be defined as:

$$\text{Wafer-fab yield} \times \text{Wafer-sort yield} \times \text{Packaging yield} = \text{Overall Yield},$$

Wafer-fab yield, wafer-sort yield and packaging yield may all be expressed in terms of percentages. For example wafer-fab yield may be determined by dividing the number of wafers produced by the number of wafers started. Similarly, wafer-sort yield may be expressed as the number of functioning (good) die divided by the total number of die on wafers. Likewise, packaging yield may be expressed as the number of packages passing a final test by the number of dies started into packaging. In one example, if Wafer-fab yield is 95%, Wafer-sort yield is 85%, and packaging yield is 97%, then overall yield is 95%×85%×97%=78%.

Additionally, Wafer-fab yield may be separated into the product of the yields of each unit process or step used to manufacture the die. This may be referred to as Station yield. Stations perform a number of different operations such as field oxidation, source/drain mask, source/drain doping, gate region mask, deposit metal layer, etc. For example, if a die manufacturing process has 100 process steps used to make the die, in order to meet a goal of Wafer-fab yield of 95%, each of those 100 process steps (stations) would have to have an average yield of 99.9487198%.

One technique for measuring wafer-fab yield is to use a form of pass/fail assessment of structural metrology on each die, while Wafer-sort yield may be measured by electrical/ functional performance of each die. In the industry, Wafer-sort yield is frequently meant when discussing the term "Yield". However, other terms like "In Spec" (meaning percentage within specification), "Process Yield," and "Process Limiting Yield" may also be used.

Each process step has variability, and these steps are conventionally measured in terms of mean (nominal) and standard deviation, for both the parameters controlling the step, such as gas pressure, and its resulting output, such as etch depth. There are also allowed specification ranges for the outputs.

A general discussion of yields may be found in P. Van Zant, "Microchip Fabrication, $6^{th}$ ed.," McGraw-Hill Education, 2014.

The task of Process Window Optimization may be considered as follows: Given a set of processes with input and output variation, possible ranges of inputs, and allowed ranges of outputs (the specification), determine the optimal settings (nominal and standard deviation) for each parameter that maximizes yield. (These optimal settings can themselves have ranges). PWO as described herein seeks to optimize parameter settings/ranges in a virtual fabrication environment that maximizes InSpec yield, which is calculated by determining the fraction or adjusted fraction of runs whose virtual metrology or virtual electrical performance are within user entered specification ranges. The overall process space (search space) may be generated by a Monte Carlo simulation.

Conventional approaches to performing process window optimization suffer from a number of drawbacks. Process engineers typically need analyses completed in a few days and it can take months to produce a sufficiently large number of virtual wafers via convention simulation. Therefore, either the number of runs or the virtual fabrication times need to be decreased by orders of magnitude. Another problem is that a Gaussian distribution for a Monte Carlo simulation is the standard approach in the industry but such a distribution biases the generated virtual wafers to be much closer to the center of the search space where the parameter nominals are located (nominals or nominal values correspond to the desired value for an input parameter). Few or no wafers are built farther from the center of the search space using the Gaussian distribution, depending on how the variance of the space is defined by the user, meaning that important yield information is missed due to the lack of even representation. Generating very large numbers of virtual wafers, e.g., one million plus, helps only somewhat with this problem, and also takes far too long. A third problem is that by definition, a process window is some subset of the overall process space searched via the Monte Carlo simulation. Uncertainty in calculated yield increases as sample size decreases. Therefore, as a process window narrows, fewer virtual wafers are included in the process window and uncertainty in yield increases. This is an important problem when estimating yield based on a small number of virtual wafers in a narrow process window as engineers may be led to believe that they have found a process window that provides high yield when that may not be the case. If the engineers are not provided the uncertainty of the yield value, they do not know whether that value is precise and thus trustworthy. A further problem presents in the lack of useful, easy to read graphical display of results. Additionally, current approaches to performing process window optimization are not integrated into the virtual fabrication environment and require significant knowledge of statistics/programming. This prevents large numbers of users, who are process engineers and not statisticians/programmers, from performing a PWO analysis.

Embodiments of the present invention provide an approach to process window optimization that addresses may of the problems experienced with conventional techniques. As described further herein, embodiments provide a non-standard approach to generating a Monte Carlo DOE to create the initial search space. A uniform distribution is used instead of a Gaussian distribution for the Monte Carlo DOE. This uniform distribution provides a roughly even distribution of runs across the search space, unlike the set of results produced from a Gaussian Monte Carlo. Sets of parameters (runs) at the farther edges of the search space, which are highly unlikely to be produced in a Gaussian Monte Carlo, become much more likely in a uniform Monte Carlo. Thus, potentially important areas of the search space are not overlooked as they are in the current approach relying on Gaussian distributions. Because the runs are roughly evenly distributed, a huge number of runs overall (e.g.: one million plus) are not required to achieve a small number of runs at the farther edges of the search space. For example, in one embodiment a total number of runs required with a uniform Monte Carlo may be reduced to between 100 to 10,000. The reduction in the number of virtual fabrication runs leads to a correspondingly large decrease in calculation time which meets the time requirements of users. Embodiments further address the problem of uncertainty in yield by providing confidence intervals (CI). Yield values for process windows with a large number of runs are precise; yield values for process windows containing a small number of runs can be much more uncertain. The process window optimization techniques described herein provides a CI range the yield can be expected to be within 95% of the time, given the number of runs. This CI for yield also allows the user to quickly learn if the overall number of runs used for the search space is large enough (if not, the CI is very wide for many parameters). Further, embodiments enable a user to visually assess the sensitivity of yield to parameter nominal and window size, and perform "what-if" analyses within the UI. Finally, the analytics module performing the process window optimization techniques described herein is integrated into a virtual fabrication environment. The analytics module enables engineers to perform PWO despite lacking statistical knowledge and avoids the inability of external software to correctly handle the problem. In one embodiment, statistical and mathematical algorithms are concealed from the user beneath a user interface, which is designed as a Wizard to guide users through the steps to obtain a solution.

As noted above, embodiments enable a user accessing a virtual fabrication environment to conduct PWO to analyze and understand the sensitivity of the yield of the process of record (POR) to parameter nominal values and window sizes. In one embodiment, a search space is generated using a uniform distribution Monte Carlo simulation to perform multiple virtual fabrication runs based on input parameters specified for a particular D.O.E. Each virtual fabrication run is a full 3D model build that creates one virtual wafer. Sensitivity analyses of yield to each parameter are computed by the analytics module in the virtual fabrication environment and the results displayed graphically. Embodiments enable the user to create "what-if" analyses within the search space that assess yield improvement by adjusting parameter nominals and allowed ranges, starting from the POR. In one embodiment, PWO can calculate a parameter set maximizing yield given a current search space.

Figure 13:
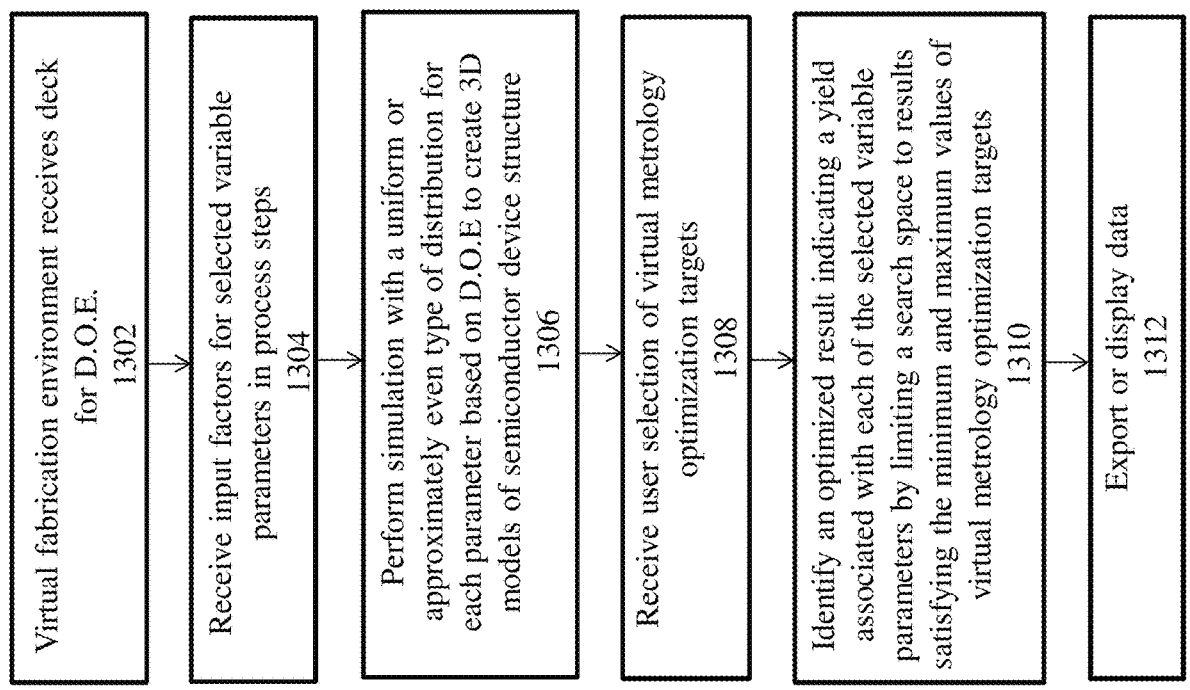
FIG. 13 depicts a sequence of steps used to perform process window optimization in an exemplary embodiment.

FIG. 13 depicts a sequence of steps used to perform process window optimization in an exemplary embodiment. The sequence begins with the receipt of a selected deck for a D.O.E. by the virtual fabrication environment and the analytics module after the user indicates a desire to perform process window optimization (step 1302). The deck is the 2D design data and process sequence containing the multiple steps required for fabrication of a semiconductor device structure of interest. The deck may be a pre-existing deck that was previously used for either physical or virtual fabrication that is selected by a user. The deck may also be programmatically selected. Alternatively, the 2D design data and process sequence may be selected manually, at least in part, by a user via graphical user interfaces (or other user interfaces) provided by the virtual fabrication environment that are used to select and specify individual elements and associated parameters in the deck. In one embodiment, the user may specify the number of virtual fabrication runs for the D.O.E. For example, in an embodiment, the user may specify a number of runs between 100 and 10,000.

The sequence of FIG. 13 continues with the receipt of input factors for one or more selected variable parameters in one or more of the process steps in the D.O.E. (step 1304). The variable parameters may be parameters that are of particular importance to the design and/or user. In one embodiment, the selected variable parameters may have been previously programmatically identified as important/key variable parameters by the analytics module using techniques described in U.S. patent application Ser. No. 16/010,537, entitled "System and Method for Key Parameter Identification, Process Model Calibration, and Variability Analysis in a Virtual Semiconductor Device Fabrication Environment", the contents of which are incorporated herein by reference in their entirety. The programmatically identified important(key) parameters may be displayed or otherwise provided by the analytics module to a user to reference in making variable parameter selections or may be used to programmatically select selected variable parameters to perform PWO. Alternatively, in another embodiment, the selected variable parameters may be identified by a user via a provided user interface in the virtual fabrication environment. In some embodiments, the input factors may include a search space upper and lower limit value and POR specifications for each of the selected variable parameters. In one embodiment, as discussed further below, the upper and lower limit values become the minimum and maximum values used to generate a Monte Carlo simulation. The POR specifications define the existing "best" process in the physical fab and/or the virtual fabrication environment. The POR settings may include nominal values, type of distribution (uniform or normal), and either standard deviation or width (depending on the chosen distribution). This value might correspond, for example, to a device's etch rate. The POR data provides the necessary information used to calculate starting/POR yield as discussed further below.

Figure 14A:
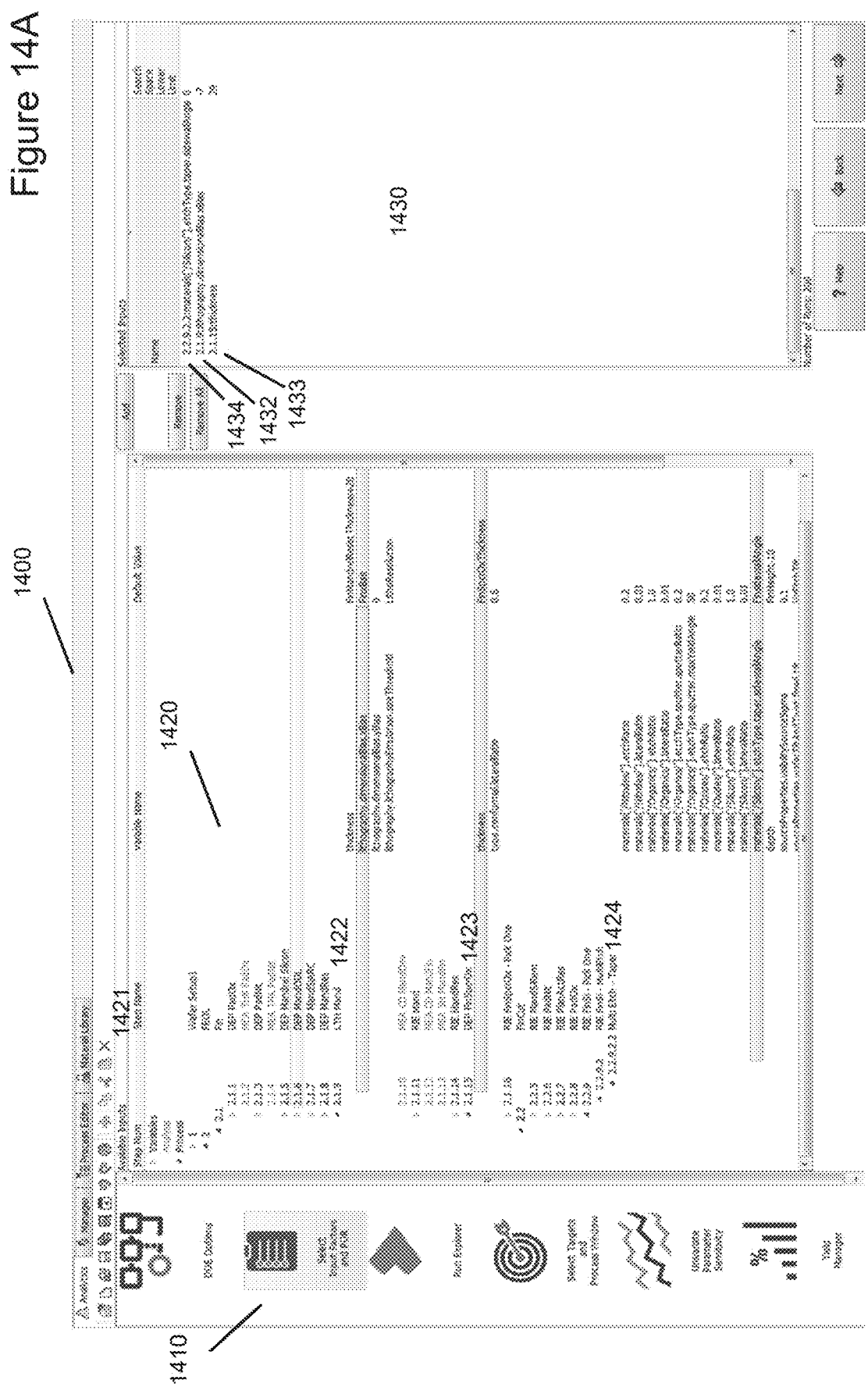

FIGS. 14A-14B depict exemplary user interfaces suitable for receiving input factors and POR values in exemplary embodiments. For example, FIG. 14A depicts a graphical user interface 1400 that includes a left pane 1410 showing a current step in performing process window optimization of "select input factors" highlighted. The main window 1420 lists process steps 1421 from the selected deck, associated variable names for each process and default values. Selected variable parameters are listed in the right pane 1424 of the user interface. For example, in FIG. 14A, the depiction of three separate variable parameters in three separate process steps of a virtual fabrication run is shown. In a Lithography Mandrel step 2.19 (1422), the variable parameter "lithography.dimensionBias.xBias" has been selected and appears in the right panel 1432. In step 2.1.15 a deposition step for a Fin Spacer Oxide 1423, a "thickness" variable parameter has been selected and appears in the right panel 1433. In step 2.2.9.2.2 of the virtual fabrication process, a multi-etch taper step 1424, a variable parameter "materials('Silicon/').etchType.taper.sidewallAngle" has been selected and appears in the right panel 1434. Once a variable parameter is selected, a graphical user interface 1450, such as the one depicted in FIG. 14B, is provided by the virtual fabrication environment and enables the user to provide minimum 1452 and maximum 1454 values for each selected variable parameter. Associated POR values 1456a, 1456b and 1456c are also displayed. As noted above, the POR values represent a starting point within the min/max range and represent a currently anticipated best value for fabricating the semiconductor device structure of interest.

Returning to FIG. 13, following the receipt of the input factors, in response to a user run command, the analytics module performs, based on the D.O.E., a simulation in the virtual fabrication environment. The simulation performs multiple virtual fabrication runs that respectively build 3D models of the semiconductor device structure (step 1306). In an exemplary embodiment, the simulation is a Monte Carlo simulation using a uniform distribution for each parameter. Embodiments may use a Monte Carlo simulation to create a search space that is sampled in an even fashion (extreme parameter values are as likely as values near the center or anywhere else in the allowed range). Using uniform distributions for the parameters accomplishes this aim. This allows PWO to be performed with hundreds to thousands of runs, instead of tens of thousands to millions of runs as would be required if the search space was generated using normally distributed parameters (in that case, there would be far fewer runs at the extremes and the overall run size would have to be greatly increased to better sample the edge regions). Process parameters are often assumed by engineers to be normally distributed. The probability of a run and its associated yield are dependent upon the convolution of the distribution of the sampling of the search space and the parameter distributions. By using a uniform distribution for the search space, embodiments avoid having too few runs at the extremes and also can calculate the convolution of the parameter and search space distributions, because each point in the search space has an equal probability, having been generated using a uniform distribution.

In alternative embodiments, other methods of creating a search space with almost or exactly even sampling may be used in place of uniformly distributed random numbers from a Monte Carlo simulation. For example, point generation methods like Quasi-Monte Carlo with generating sequences such as the Halton sequence, the Sobol sequence, or the Faure sequence could be used. In such an approach, the distribution of the search space has to be known and be able to be convolved with the normal distribution of parameters to generate probabilities of runs and their associated yields.

Figure 15:
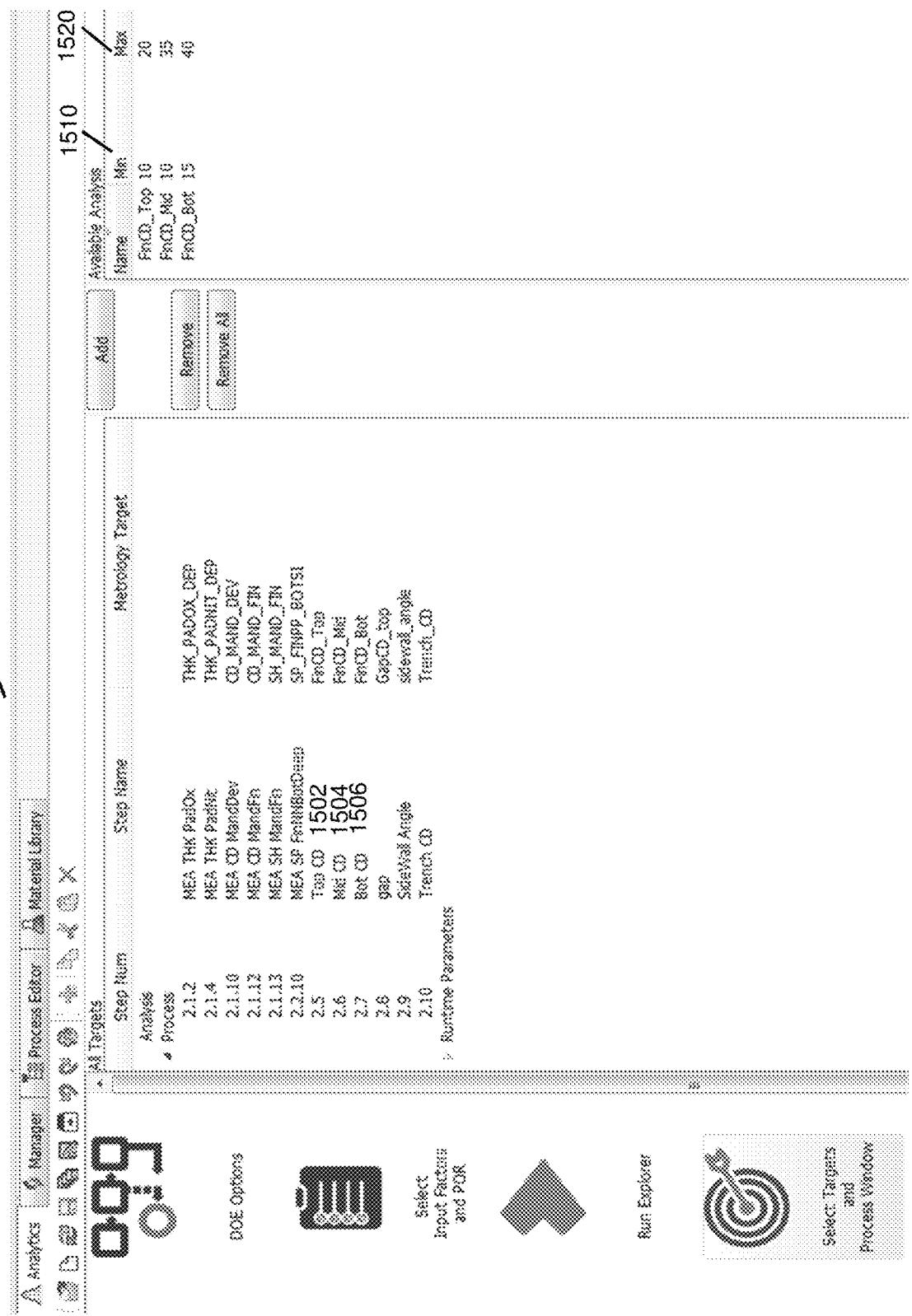
FIG. 15 depicts an exemplary user interface suitable for receiving virtual metrology optimization target values in a virtual fabrication environment in an exemplary embodiment.

Once the simulation has completed (the 3D models have been built and virtual metrology calculated for each run), the analytics module receives, via a user interface in the virtual fabrication environment, a user selection of one or more virtual metrology optimization targets (step 1308). Each selection of virtual metrology optimization targets is accompanied by a specification of minimum and maximum virtual metrology value. FIG. 15 depicts an exemplary user interface 1500 suitable for receiving virtual metrology optimization targets in a virtual fabrication environment in an exemplary embodiment. The user interface enables the user to narrow the initial search space created by specifying acceptable ranges of values for selected virtual metrology targets. For example, in FIG. 15, the user has selected three virtual metrology targets, FinCD_Top 1502, FinCD_Mid 1504 and FinCD_Bot 1506 and their respective associated minimum 1510 and maximum 1520 values for top, middle and bottom critical dimensions for a semiconductor fin structure.

Returning to FIG. 13, in step 1310, the analytics module identifies an optimized result indicating a yield associated with each of the selected variable parameters by limiting the search space to results also satisfying the minimum and maximum values of virtual metrology optimization targets. Once identified, the optimized result may be displayed to a user in the virtual fabrication environment or exported for storage or further use by third parties/other software (step 1312).

In one embodiment, to identify the optimized result, the analytics module performs univariate parameter sensitivity analysis. In an embodiment, the univariate parameter sensitivity analysis relies on three items: 1) the results of the Monte Carlo simulation that provide an initial search space 2) the input window defined by the received input factors; and 3) the target ranges provided by the virtual metrology optimization target minimum and maximum values. In one embodiment, the input window defined by the received input factors may be defined in two ways. For POR specifications from a uniform distribution, the input window may be defined as [nominal−width/2, nominal+width/2] while for normal distribution POR specifications the input window may be defined as [nominal−3*std, nominal+3*std]. Engineers often treat process parameters as being normally distributed, but in certain circumstances may not wish to use that assumption, in which case a uniform distribution is appropriate.

For example, a sidewallAngle parameter may have an initial window of 5±3×1 or 2 to 8. Its search space is from 0 to 10, so the window can be moved to have a nominal as low as 3 (where the lower −3σ end of the window would be at the minimum of 0 and the upper +3σ end of the window would be at 6) or as high as 7 (where the upper +3σ end of the parameter window would lie at 10, and the lower −3σ end of the window would be at 4).

The yield is based on the input window and target range. In one embodiment, yield Y is defined as:

$$Y = \text{sum}(Pi)/\text{sum}(Pj) = 100 * A_s/A_t$$

Where Pj is the probability that a run will fall within the input window (run value is within nominal ±3σ or nominal ±width/2, depending on chosen distribution), and Pi is the probability that a run that falls within the input window satisfies the target range defined by the received virtual metrology optimization target values. $A_s$ is the number of successful virtual fabrication runs adjusted for the POR distribution defined by the user and $A_t$ is the number of total runs adjusted for the POR distribution defined by the user. Put another way, to determine yield the analytics module determines how many of the virtual fabrication runs from the simulation produce models that fall within the input window while also satisfying the virtual metrology optimization target ranges provided by the user and divides that number by the number of total runs falling within the input window. Furthermore, probability is adjusted by the analytics module in the event any parameters had their distribution chosen to be normal by users.

Figure 16A:
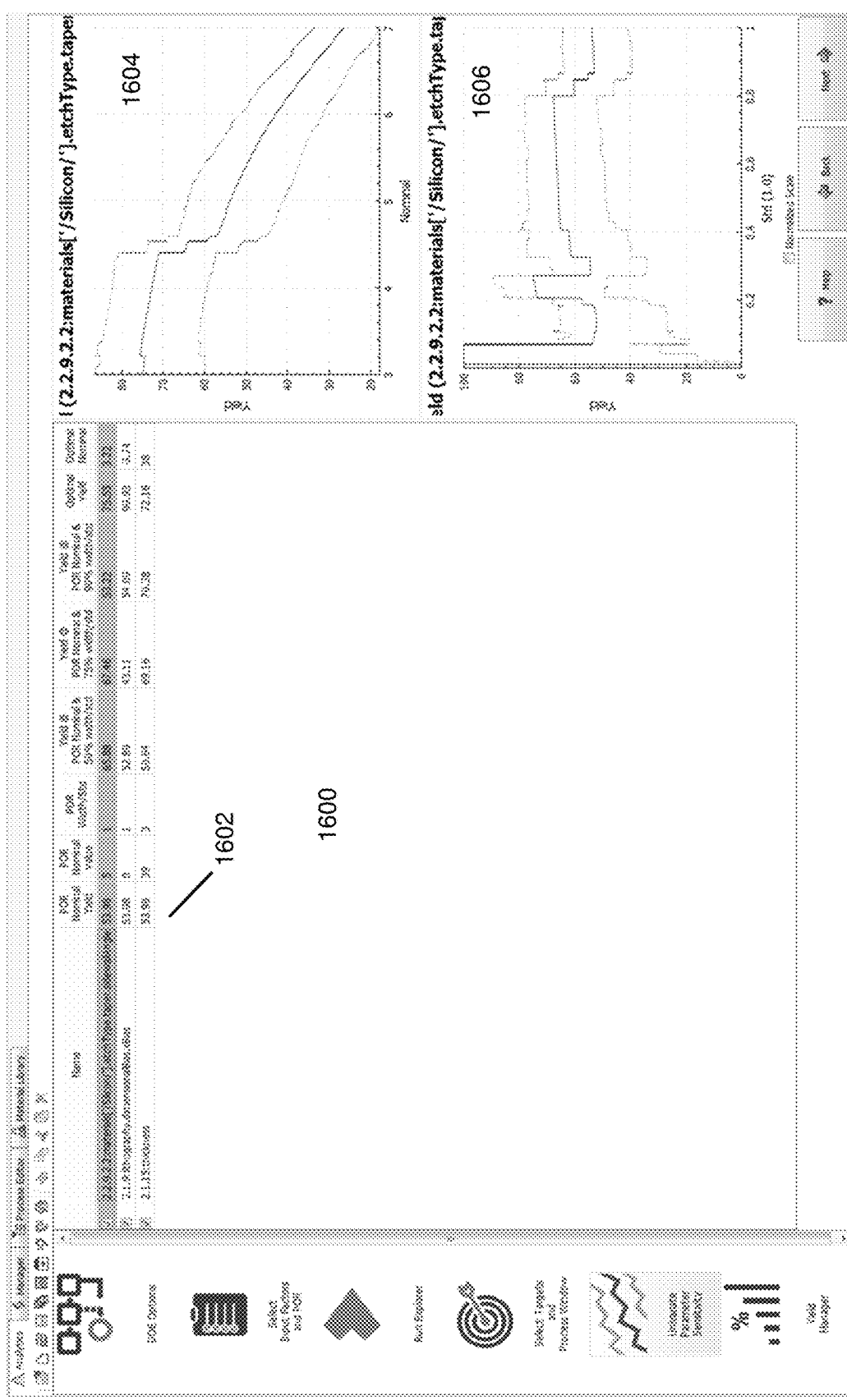
FIG. 16A depicts an exemplary user interface for displaying univariate parameter sensitivity values in an exemplary embodiment.

The univariate parameters sensitivity analysis information determined by the analytics module may be provided to the user of the virtual fabrication environment via a number of user interfaces provided by the virtual fabrication environment that both enable the user to view the information and to conduct further operations. FIG. 16A depicts an exemplary user interface for displaying univariate parameter sensitivity values in an exemplary embodiment. The main window 1600 of the graphical user interface depicted in FIG. 16A provides a table 1602 containing information about the sensitivity of the yield to each parameter (shown in greater detail in FIG. 16B), while the window on the right side displays two plots 1604, 1606 of yield-related information related to the variable parameter selected in the table).

In one embodiment, the sensitivity table 1602 depicted in FIG. 16A and FIG. 16B contains the following information about each selected variable parameter. The shaded inputs are displayed in the plots to the right of the table and may include the following:

POR Nominal Yield (1610): yield over the input window, defined based on the POR Nominal values from the received input factors;

POR Nominal Value (1612): the POR Nominal values for each parameter defined in the received input factors;

POR Width/Std (1614): the POR Width and POR Std values defined in the received input factors;

Yield @ POR Nominal & 50% width/std (1616): The yield calculated at the POR Nominal for width=0.5 (POR width) or std=0.5(POR std);

Yield @ POR Nominal & 75% width/std(1618): The yield calculated at the POR Nominal for width=0.75(POR width) or std=0.75(POR std);

Yield @ POR Nominal & 90% width/std (1620): The yield calculated at the POR Nominal for width=0.9 (POR width) or std=0.9(POR std);

Optimal Yield (1622): the maximum yield that the user can obtain by shifting the nominal value for the selected input, while the nominal values for all other input factors are kept at their POR Nominal values; and Optimal Nominal (1624): the nominal value corresponding to the Optimal Yield for the selected input.

In FIG. 16B the displayed POR Nominal Yield is approximately 54% indicating that further improvement in yield may be possible by optimizing parameter nominals. Also noteworthy in FIG. 16B is that adjusting the width of the input window between 50% and 90% appears only mildly beneficial in improving yield.

Figure 16C:
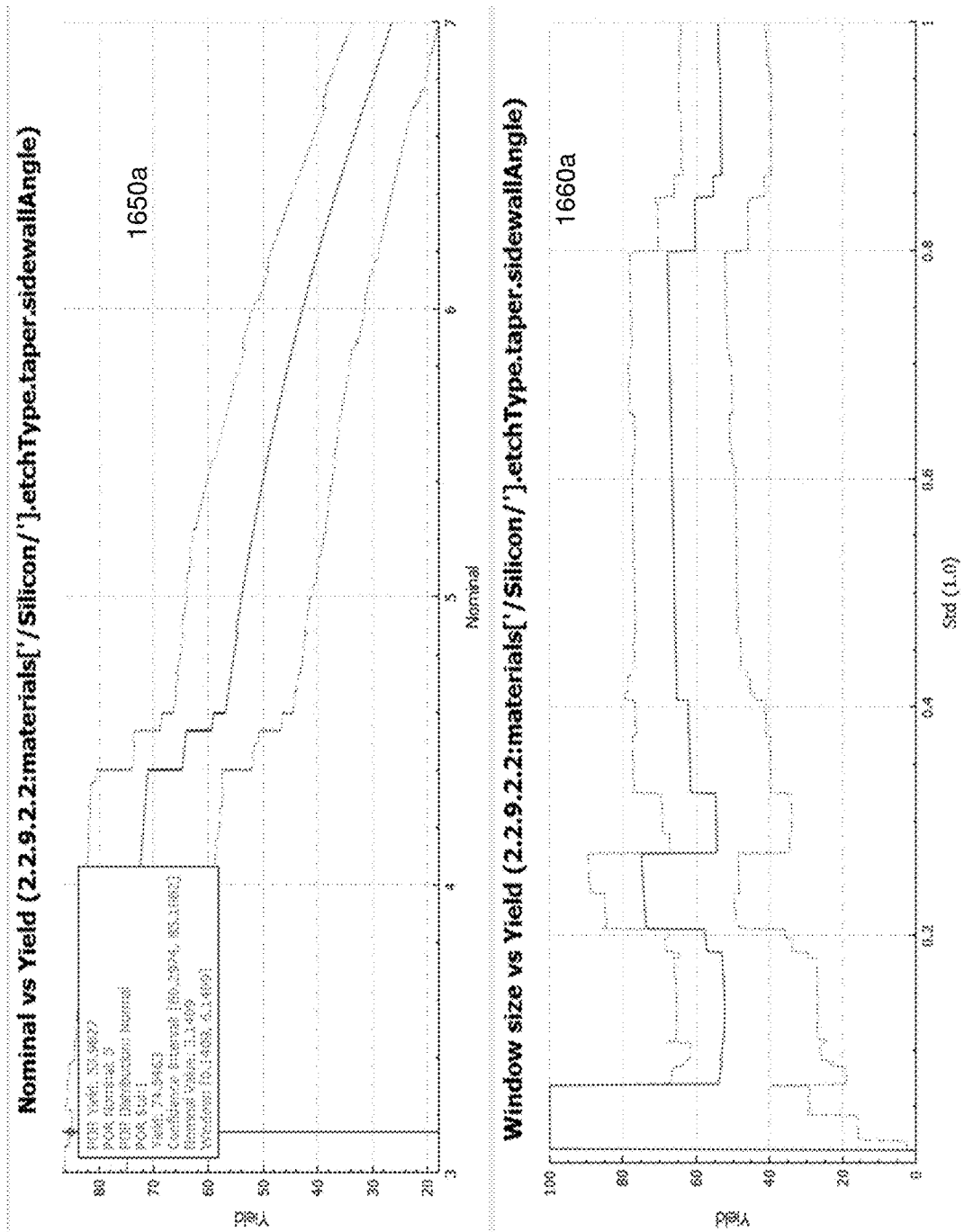
FIGS. 16C-16E depicts exemplary user interfaces displaying univariate parameter sensitivity values for selected parameter variables in a plot format in an exemplary embodiment.
Figure 16D:
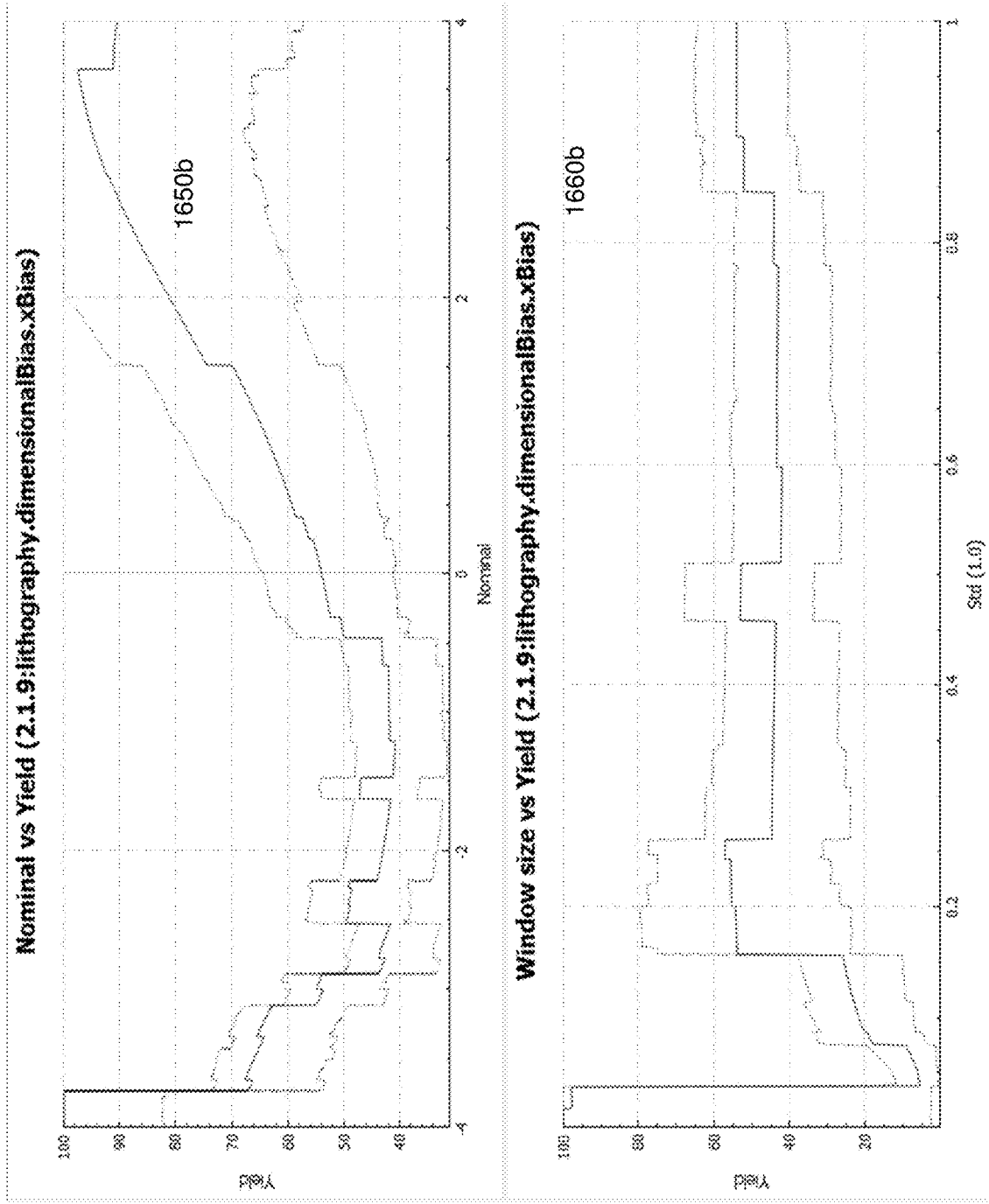
Figure 16E:
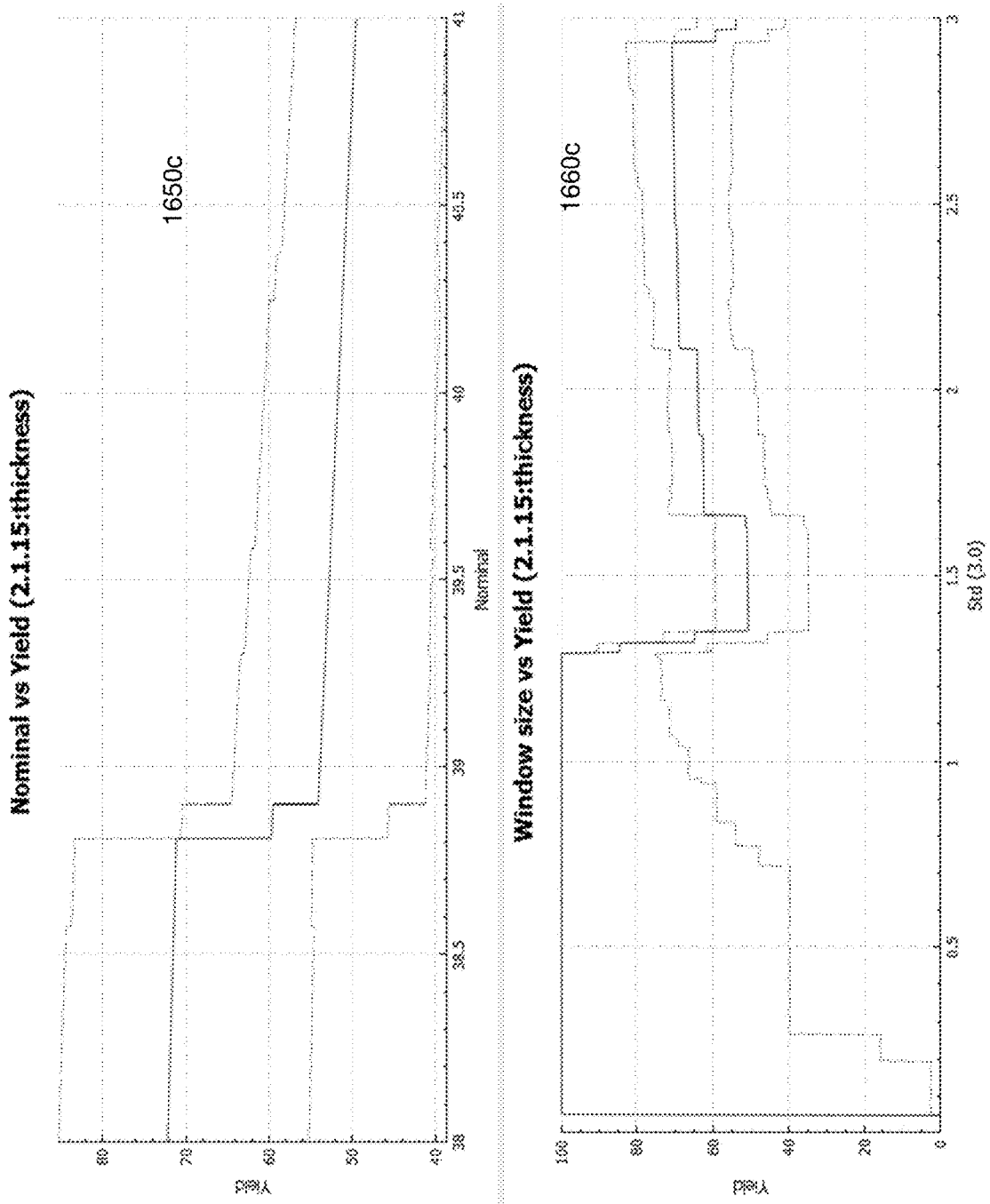

The use of plots for displaying univariate parameter sensitivity values for selected parameter variables in exemplary embodiments is shown in greater detail in FIGS. 16C-16E which respectively show yield information for each of the variable parameters listed in the tables of FIGS. 16A-16B. For example, the Nominal vs. Yield plots 1650a, 1650b and 1650c depicted in FIGS. 16C-16E are generated for each input parameter, and displayed for the parameter that was selected in the sensitivity table. In FIG. 16C the plot 1650a indicates that the yield declines as the sidewall angle decreases and that the yield is less sensitive to width. In FIG. 16D the plot 1650b indicates that the yield has a parabolic relationship with xBias and that the yield is less sensitive to width. In FIG. 16E the plot 1650c indicates that yield declines with increasing thickness and yield has two levels with respect to width.

Confidence intervals for the yield may also be identified on the plot. The plot for a selected variable parameter input depicts the resulting yield for all nominal values within the permissible nominal range, while the POR width or POR std are kept at their originally chosen values. The POR nominal, POR width, and POR std for all other inputs are kept at their original values. In one embodiment, to probe the plot for results at a particular point, a user may hover the mouse over the point of interest in the graphical user interface and a window (data tip) is displayed in the upper left corner of the plot, containing the following information:

POR Yield
POR Nominal
POR Distribution Type
POR Std or POR Width
Yield at that nominal value
Confidence Interval for the yield, shown as the top and bottom lines on either side of the yield plot in the middle
The Nominal Value shown
Input Window around the nominal point The Window Size vs. Yield plots 1660a, 1660b and 1660c may also be generated for each input parameter as depicted in FIGS. 16C-16E. Yield is calculated around the POR Nominal for decreasing width/std values, the limiting case being that the input window approaches a width or std of zero. The corresponding yield is given on the Y-axis. On the X-axis, "std/width (based on distribution type" describes the size of the interval around the nominal. (Checking the Normalized Scale box displays the yield at a particular fraction of the POR width or POR std, from 0 to 1.)

Figure 17A:
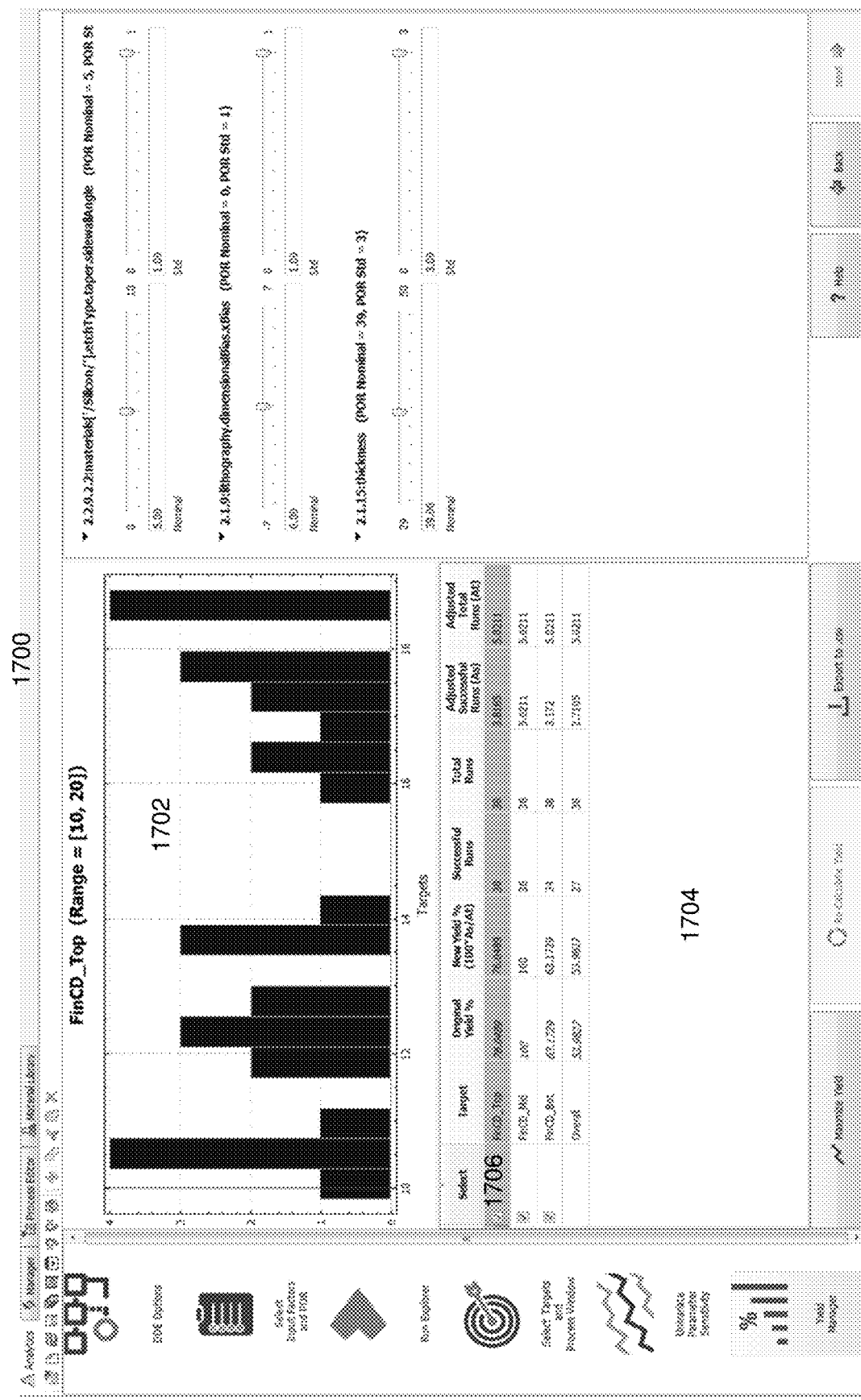
FIG. 17A depicts an exemplary user interface for displaying yield results associated with selected parameter variables in a histogram format before performing process window optimization in an exemplary embodiment.
Figure 17B:
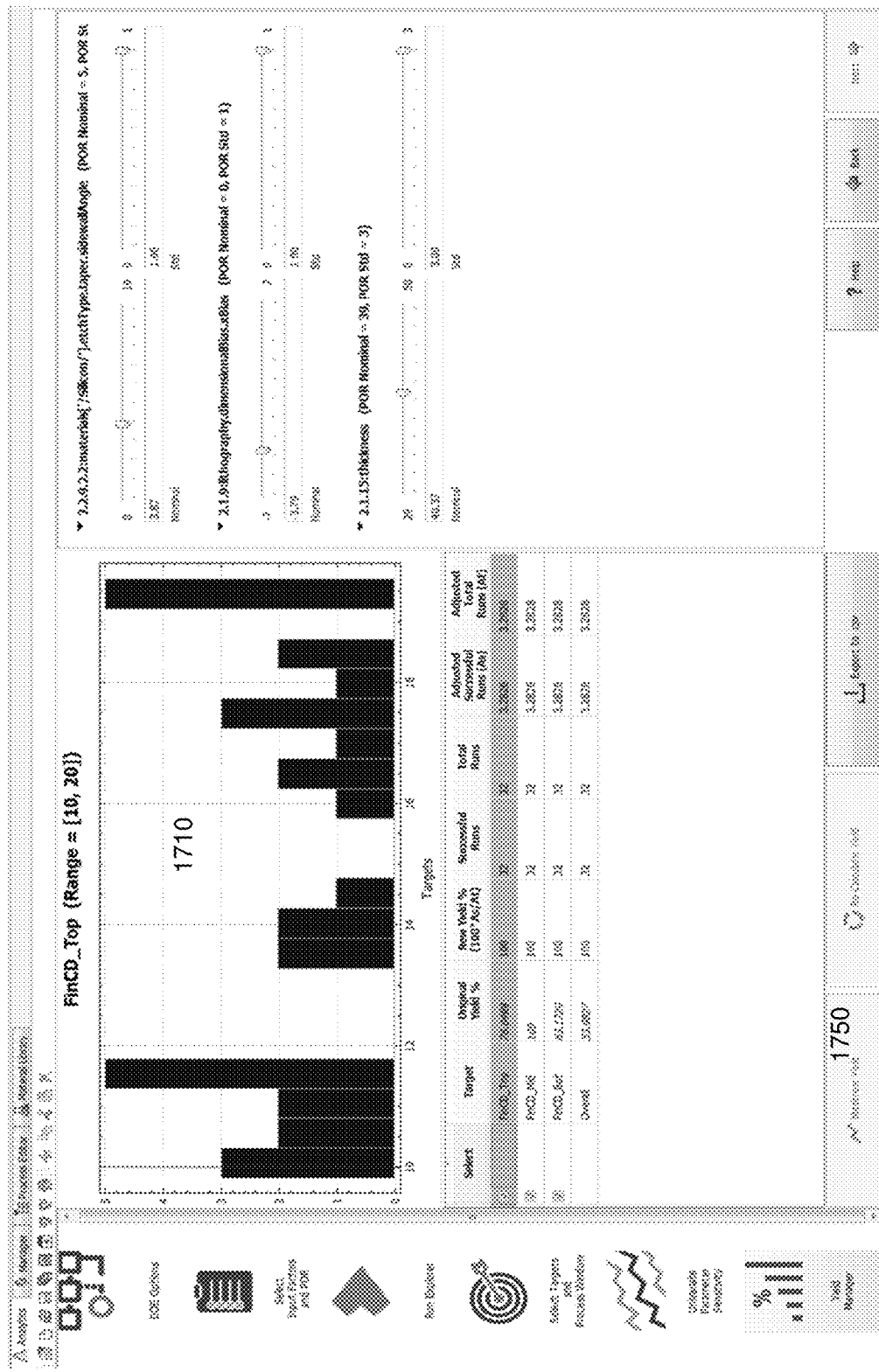
FIG. 17B depicts an exemplary user interface for displaying yield results associated with selected parameter variables in a histogram format after performing process window optimization in an exemplary embodiment.

In an embodiment, a graphical user interface may be provided that provides a yield manager tool as shown in FIGS. 17A and 17B. FIG. 17A depicts an exemplary user interface 1700 for displaying yield results associated with selected parameter variables in a histogram format 1702 before performing process window optimization in an exemplary embodiment. The yield manager of FIG. 17A enables a user to visualize, maximize, and calculate the yield for different target ranges and input parameter nominal and width or std combinations. FIG. 17B depicts an exemplary user interface for displaying yield results associated with selected parameter variables in a histogram format 1720 after performing process window optimization in an exemplary embodiment. FIGS. 17A-17B display information about the target 1706 clicked in the target table 1704 in a histogram format. The X-axis displays the target values within the specified target range defined based on the received virtual metrology optimization target (min/max) values. The Y-axis displays the number of times that target value appears in the included runs from the yield calculations. The target tables on the lower left side of the pane in FIGS. 17A-17B includes the target names, original yields (calculated based on the POR nominal and POR width/std values for all inputs), and new yields as they are calculated based on settings specified in the fields on the right side of the user interface. On the right side of the user interface, input fields and sliders allow manipulation of the nominal and window width or standard deviation for chosen input parameters. The user may either move the sliders, or enter desired values in the boxes below the sliders. After updating the values, a user may click the Re-Calculate Yield button at the bottom of the pane to see the yield for the new chosen nominal and/or width/std value. Calculations previously used to determine yield are repeated, but with the nominal std/width values adjusted by the user being used in place of the original POR values. The Maximize Yield button calculates the maximum yield based on the targets included in the target table selections. In one embodiment, the sliders adjust to reflect the nominal values corresponding to the maximum overall yield but do not adjust the width/std values. As shown in FIG. 17B, pressing a maximum yield button 1750 triggers the analytics module to identify an overall yield at 100% when the optimized nominal values are adjusted as shown in the slider area in the right window pane. It should be appreciated that not every D.O.E. can be adjusted by the analytics module to achieve an overall yield of 100%.

Portions or all of the embodiments of the present invention may be provided as one or more computer-readable programs or code embodied on or in one or more non-transitory mediums. The mediums may be, but are not limited to a hard disk, a compact disc, a digital versatile disc, a flash memory, a PROM, a RAM, a ROM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

We claim:

1. A non-transitory computer-readable medium holding computing device-executable instructions for performing process window optimization in a virtual fabrication environment for semiconductor device fabrication, the instructions when executed causing at least one computing device equipped with one or more processors to:
   receive, for a Design of Experiment (DOE) for a semiconductor device structure to be virtually fabricated in a computing device-generated virtual fabrication environment, a selected deck of 2D design data and a process sequence that includes a plurality of process steps;
   receive one or more input factors for one or more selected variable parameters for one or more of the plurality of process steps in the DOE;
   perform, based on the DOE, a simulation with a uniform or approximately even type of distribution in the virtual fabrication environment, the simulation including a plurality of virtual fabrication runs, the plurality of virtual fabrication runs building a plurality of 3D models of the semiconductor device structure;
   receive, via a user interface in the virtual fabrication environment, a user selection of one or more virtual metrology optimization targets, each selection of the one or more virtual metrology optimization targets accompanied by a minimum and maximum virtual metrology value;
   identify in the virtual fabrication environment an optimized result indicating a yield associated with each of the one or more selected variable parameters by limiting a search space to results satisfying the minimum and maximum virtual metrology values for the virtual metrology optimization targets, wherein the yield is determined based on a percentage of the plurality of virtual fabrication runs that result in corresponding 3D models satisfying the minimum and maximum virtual metrology values; and
   display or export the optimized result associated with each of the one or more selected variable parameters, wherein the displayed or exported optimized result includes an indication of a sensitivity of the yield to each of the one or more selected variable parameters and a sensitivity of the yield to a width of an input window used for selecting values of each of the one or more selected variable parameters in the plurality of virtual fabrication runs, the input window centered on a nominal value for the one or more selected variable parameters and the width of the input window indicative of an acceptable variability of the one or more selected variable parameters.

2. The medium of claim 1 wherein the simulation is a Monte Carlo simulation and receiving the one or more input factors includes receiving an upper and lower limit value and a specification of a process of record (POR) nominal value for each of the one or more selected variable parameters, the instructions when executed further causing the at least one computing device to:
 display the optimized result indicating a yield associated with each of the one or more selected variable parameters when varying its value between its upper and lower limit value while holding the remaining parameters of the one or more selected variable parameters at their respective POR nominal values.

3. The medium of claim 2, wherein the instructions when executed further cause the at least one computing device to:
 display a pre-optimization result from results of the Monte Carlo simulation indicating a yield associated with each of the one or more selected variable parameters when using the respective POR nominal values, the pre-optimization result displayed before displaying the optimization result.

4. The medium of claim 1, wherein the one or more selected variable parameters are programmatically identified in the virtual fabrication environment prior to the receipt of the one or more input factors.

5. The medium of claim 1 wherein the one or more selected variable parameters are user-selected and received via a user interface generated in the virtual fabrication environment.

6. The medium of claim 1, wherein the instructions when executed further cause the at least one computing device to:
 display a confidence interval for the yield indicated in the optimized result.

7. The medium of claim 1, wherein the instructions when executed further cause the at least one computing device to:
 receive a user-selected number of virtual fabrication runs for the DOE.

8. The medium of claim 1 wherein the virtual metrology optimization targets are selected from a displayed list of a plurality of available virtual metrology targets based on and following the performance of the simulation.

9. The medium of claim 1 wherein the optimized result for each of the one or more selected variable parameters is displayed in a tabular or plot format.

10. The medium of claim 1 wherein the optimized result for each of the one or more selected variable parameters is displayed in a histogram format.

11. A computing device implemented method for performing process window optimization in a virtual fabrication environment for semiconductor device fabrication, the method perform with at least one computing device including one or more processors, the method comprising:
 receiving, for a Design of Experiment (DOE) for a semiconductor device structure to be virtually fabricated in a computing device-generated virtual fabrication environment, a selected deck of 2D design data and a process sequence that includes a plurality of process steps;
 receiving one or more input factors for one or more selected variable parameters for one or more of the plurality of process steps in the DOE;
 performing, based on the DOE, a simulation with a uniform or approximately even type of distribution in the virtual fabrication environment, the simulation including a plurality of virtual fabrication runs, the plurality of virtual fabrication runs building a plurality of 3D models of the semiconductor device structure;
 receiving, via a user interface in the virtual fabrication environment, a user selection of one or more virtual metrology optimization targets, each selection of the one or more virtual metrology optimization targets accompanied by a minimum and maximum virtual metrology value;
 identifying in the virtual fabrication environment an optimized result indicating a yield associated with each of the one or more selected variable parameters by limiting a search space to results satisfying the minimum and maximum virtual metrology values for the virtual metrology optimization targets, wherein the yield is determined based on a percentage of the plurality of virtual fabrication runs that result in corresponding 3D models satisfying the minimum and maximum virtual metrology values; and
 displaying or exporting the optimized result associated with each of the one or more selected variable parameters, wherein the displayed or exported optimized result includes an indication of a sensitivity of the yield to each of the one or more selected variable parameters and a sensitivity of the yield to a width of an input window used for selecting values of each of the one or more selected variable parameters in the plurality of virtual fabrication runs, the input window centered on a nominal value for the one or more selected variable parameters and the width of the input window indicative of an acceptable variability of the one or more selected variable parameters.

12. The method of claim 11 wherein the simulation is a Monte Carlo simulation and receiving the one or more input factors includes receiving an upper and lower limit value and a specification of a process of record (POR) nominal value for each of the one or more selected variable parameters, the method further comprising:
 displaying the optimized result indicating a yield associated with each of the one or more selected variable parameters when varying its value between its upper and lower limit value while holding the remaining parameters of the one or more selected variable parameters at their respective POR nominal values.

13. The method of claim 12, further comprising:
 displaying a pre-optimization result from results of the Monte Carlo simulation indicating a yield associated with each of the one or more selected variable parameters when using the respective POR nominal values, the pre-optimization result displayed before displaying the optimization result.

14. The method of claim 11, wherein the one or more selected variable parameters are programmatically identified in the virtual fabrication environment prior to the receipt of the one or more input factors.

15. The method of claim 11 wherein the one or more selected variable parameters are user-selected and received via a user interface generated in the virtual fabrication environment.

16. The method of claim 11, the method further comprising:
 displaying a confidence interval for the yield indicated in the optimized result.

17. The method of claim 11, the method further comprising:
 receiving a user-selected number of virtual fabrication runs for the DOE.

18. The method of claim 11 wherein the virtual metrology optimization targets are selected from a displayed list of a plurality of available virtual metrology targets based on and following the performance of the simulation.

19. The method of claim 11 wherein the optimized result for each of the one or more selected variable parameters is displayed in a tabular or plot format.

20. The method of claim 11 wherein the optimized result for each of the one or more selected variable parameters is displayed in a histogram format.

21. A virtual fabrication system, comprising:
at least computing device equipped with one or more processors and configured to generate a virtual fabrication environment for semiconductor device fabrication that includes an analytics module, the virtual fabrication environment:
receiving, for a Design of Experiment (DOE) for a semiconductor device structure to be virtually fabricated, a selected deck of 2D design data and a process sequence that includes a plurality of process steps;
receiving one or more input factors for one or more selected variable parameters for one or more of the plurality of process steps in the DOE;
performing, based on the DOE, a simulation with a uniform or approximately even type of distribution, the simulation including a plurality of virtual fabrication runs, the plurality of virtual fabrication runs building a plurality of 3D models of the semiconductor device structure;
receiving, via a user interface, a user selection of one or more virtual metrology optimization targets, each selection of the one or more virtual metrology optimization targets accompanied by a minimum and maximum virtual metrology value;
identifying an optimized result indicating a yield associated with each of the one or more selected variable parameters by limiting a search space to results satisfying the minimum and maximum virtual metrology values for the virtual metrology optimization targets, wherein the yield is determined based on a percentage of the plurality of virtual fabrication runs that result in corresponding 3D models satisfying the minimum and maximum virtual metrology values; and
displaying or exporting the optimized result associated with each of the one or more selected variable parameters, wherein the displayed or exported optimized result includes an indication of a sensitivity of the yield to each of the one or more selected variable parameters and a sensitivity of the yield to a width of an input window used for selecting values of each of the one or more selected variable parameters in the plurality of virtual fabrication runs, the input window centered on a nominal value for the one or more selected variable parameters and the width of the input window indicative of an acceptable variability of the one or more selected variable parameters; and
a display surface in communication with the at least one computing device, the display surface configured to display the plurality of 3D structural models in a 3D view and the optimized result.

22. A non-transitory computer-readable medium holding computing device-executable instructions for performing process window optimization in a virtual fabrication environment for semiconductor device fabrication, the instructions when executed causing at least one computing device equipped with one or more processors to:
receive, for a semiconductor device structure to be virtually fabricated in a computing device-generated virtual fabrication environment, a selected deck of 2D design data and a process sequence that includes a plurality of process steps;
receive one or more input factors for one or more selected variable parameters for one or more of the plurality of process steps;
perform, using the one or more input factors, a simulation with a uniform or approximately even type of distribution in the virtual fabrication environment, the simulation including a plurality of virtual fabrication runs, the plurality of virtual fabrication runs building a plurality of 3D models of the semiconductor device structure;
receive, via a user interface in the virtual fabrication environment, a user selection of one or more virtual metrology optimization targets;
identify in the virtual fabrication environment an optimized result corresponding to an optimized process window indicating a yield associated with each of the one or more selected variable parameters, each associated with one or more of the plurality of process steps, by limiting a search space for optimized process parameters to results satisfying the minimum and maximum virtual metrology values for the virtual metrology optimization targets; and
display or export the optimized result associated with each of the one or more selected variable parameters, wherein the displayed or exported optimized result includes an indication of a sensitivity of the yield to each of the one or more selected variable parameters and a sensitivity of the yield to a width of an input window used for selecting values of each of the one or more selected variable parameters in the plurality of virtual fabrication runs, wherein the input window is a subset of the search space, wherein the yield is determined as a percentage of the virtual fabrication runs that fall within the input window that produce models that meet the virtual metrology optimization targets, and wherein the width of the input window indicates an acceptable variability of the one or more selected variable parameters.

* * * * *